US008216055B2

(12) United States Patent
Okada

(10) Patent No.: US 8,216,055 B2
(45) Date of Patent: Jul. 10, 2012

(54) GAMING MACHINE THAT CHANGES THE NUMBER OF FREE GAMES DEPENDING ON FOOTBALL GAME RESULT THEREOF

(75) Inventor: Kazuo Okada, Tokyo (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 0 days.

(21) Appl. No.: 13/217,942

(22) Filed: Aug. 25, 2011

(65) Prior Publication Data

US 2011/0312396 A1 Dec. 22, 2011

Related U.S. Application Data

(63) Continuation of application No. 12/021,908, filed on Jan. 29, 2008, now abandoned.

(60) Provisional application No. 60/907,260, filed on Mar. 27, 2007.

(51) Int. Cl.
*A63F 9/24* (2006.01)
*A63F 13/00* (2006.01)

(52) U.S. Cl. ............................... 463/20; 463/16; 463/25

(58) Field of Classification Search ........... 463/4, 16–22
See application file for complete search history.

(56) References Cited

U.S. PATENT DOCUMENTS

| | | | | |
|---|---|---|---|---|
| 6,135,885 | A * | 10/2000 | Lermusiaux | 463/20 |
| 6,592,457 | B1 * | 7/2003 | Frohm et al. | 463/16 |
| 6,786,818 | B1 * | 9/2004 | Rothschild et al. | 463/20 |
| 7,892,092 | B2 * | 2/2011 | Matthews et al. | 463/25 |
| 2002/0187827 | A1 * | 12/2002 | Blankstein | 463/20 |
| 2004/0002374 | A1 * | 1/2004 | Brown et al. | 463/20 |
| 2004/0005918 | A1 * | 1/2004 | Walker et al. | 463/16 |

* cited by examiner

*Primary Examiner* — Steven J Hylinski
(74) *Attorney, Agent, or Firm* — Lexyoume IP Meister, PLLC.

(57) ABSTRACT

It is determined whether to execute a mini game at least during execution of a basic game. When it is determined to execute the mini game, it is displayed the predetermined number of penalty-kick shoot-out images in a display. When the penalty-kick shoot-out ends in victory, a point-number corresponding to the number of victory times is added to an accumulated point-number. Then, a free game is executed in accordance with the accumulated point-number.

4 Claims, 15 Drawing Sheets

FIG. 6 data table

| | First symbol row | second symbol row | third symbol row | fourth symbol row | fifth symbol row |
|---|---|---|---|---|---|
| Code No. | symbol | symbol | symbol | symbol | symbol |
| 00 | JACKPOT 7 | JACKPOT 7 | JACKPOT 7 | JACKPOT 7 | JACKPOT 7 |
| 01 | PLUM | BELL | CHERRY | ORANGE | APPLE |
| 02 | ORANGE | APPLE | ORANGE | PLUM | ORANGE |
| 03 | PLUM | BELL | APPLE | STRAWBERRY | BELL |
| 04 | ORANGE | CHERRY | ORANGE | BELL | PLUM |
| 05 | PLUM | ORANGE | PLUM | PLUM | BLUE 7 |
| 06 | ORANGE | PLUM | ORANGE | APPLE | ORANGE |
| 07 | PLUM | CHERRY | PLUM | BLUE 7 | APPLE |
| 08 | BLUE 7 | BELL | ORANGE | PLUM | PLUM |
| 09 | CHERRY | APPLE | PLUM | ORANGE | BELL |
| 10 | ORANGE | BELL | ORANGE | BELL | CHERRY |
| 11 | BELL | STRAWBERRY | PLUM | ORANGE | PLUM |
| 12 | ORANGE | PLUM | BELL | PLUM | BELL |
| 13 | STRAWBERRY | BLUE 7 | STRAWBERRY | CHERRY | ORANGE |
| 14 | BLUE 7 | BELL | BLUE 7 | APPLE | APPLE |
| 15 | ORANGE | APPLE | BELL | STRAWBERRY | PLUM |
| 16 | APPLE | BELL | CHERRY | CHERRY | CHERRY |
| 17 | PLUM | STRAWBERRY | PLUM | BELL | ORANGE |
| 18 | ORANGE | PLUM | ORANGE | PLUM | BELL |
| 19 | PLUM | CHERRY | PLUM | ORANGE | ORANGE |
| 20 | BLUE 7 | BELL | ORANGE | CHERRY | PLUM |
| 21 | CHERRY | APPLE | PLUM | PLUM | STRAWBERRY |

FIG. 7 payout management table

| winning combination | basic game |
|---|---|
| PLUM | 5 |
| ORANGE | 8 |
| BELL | 10 |
| CHERRY | 20 |
| STRAWBERRY | 30 |
| BLUE 7 | 40 |

FIG. 8 free game-number table

| accumulated point-number | free game-number |
|---|---|
| 0 | 10 |
| 1 | 20 |
| 2 | 40 |
| 3 | 60 |
| 4 | 80 |
| 5 | 100 |
| 6 | 120 |
| 7 | 140 |
| 8 | 160 |
| 9 | 180 |
| 10 | 200 |

FIG. 9 mini game start determining table

| | random number range | |
|---|---|---|
| | basic game | free game |
| there is a mini game | 0 ~ 156 | 0 ~ 199 |
| there is no mini game | 157 ~ 256 | 200 ~ 256 |

FIG. 10 mini game result determining table

| | random number range |
|---|---|
| mini game failure | 0 ~ 200 |
| mini game success | 201 ~ 256 |

GAMING MACHINE THAT CHANGES THE NUMBER OF FREE GAMES DEPENDING ON FOOTBALL GAME RESULT THEREOF

CROSS REFERENCE TO RELATED APPLICATION

This application claims the benefit of U.S. Provisional Application No. 60/907,260, filed on Mar. 27, 2007.

BACKGROUND OF THE INVENTION

1. Field of the Invention

The present invention relates to a gaming machine that changes the number of free games depending on a game result thereof.

2. Description of Related Art

According to the conventional slot machine, when a predetermined condition is satisfied in a basic game, a game state is provided which is referred to as a free game enabling a player to play a game without consuming a credit. When a game state is shifted to the free game state, a player can acquire many credits. For example, US20020025849 discloses a free game as a second game. In general, the number of free games (free game-number) is randomly determined. At this time, a predetermined free game-number is set.

The invention provides a gaming machine having new entertainment characteristics.

SUMMARY OF THE INVENTION

The invention provides a gaming machine having structures as described below. The gaming machine comprises a display that displays an image, a memory that stores an accumulated point-number to be updated depending on an execution result of a mini game, an input device that outputs a signal to start a basic game and a game controller programmed to operate as described in steps (a1)~(a6).

Specifically, in a step (a1), the game controller is programmed to start the basic game as the signal is received from the input device. In a step (a2), the game controller is programmed to determine whether to execute the mini game at least during execution of the basic game. In a step (a3), the game controller is programmed to display the predetermined number of penalty-kick shoot-out images in the display, when it is determined to execute the mini game. In a step (a4), the game controller is programmed to add a point-number corresponding to the number of victory times to the accumulated point-number to update the accumulated point-number, when the penalty-kick shoot-out ends in victory. In a step (a5), the game controller is programmed to determine a game-number of a free game depending on the accumulated point-number after executing the mini game. In a step (a6), the game controller is programmed to execute the free game by the game-number.

In the gaming machine of the invention, when a basic game is started as a signal is received from an input device, it is determined whether to execute a mini game at least during execution of the basic game. When it is determined to execute the mini game, the predetermined number of penalty-kick shoot-out images is displayed in a display. When the penalty-kick shoot-out ends in victory, a point-number corresponding to the number of victory times is added to an accumulated point-number to update the accumulated point-number. As a result, a free game is executed by the number of games (game-number) that is determined depending on the accumulated point-number after the mini game is executed, so that a gaming machine having new entertainment characteristics is realized.

The invention provides a gaming machine having structures as described below. The gaming machine comprises a display that displays an image, a memory that stores an accumulated point-number to be updated depending on an execution result of a mini game, an input device that outputs a signal to start a basic game and a game controller programmed to operate as described in steps (b1)~(b7).

Specifically, in a step (b1), the game controller is programmed to start the basic game as the signal is received from the input device. In a step (b2), the game controller is programmed to display a football game image in the display at least during execution of the basic game. In a step (b3), the game controller is programmed to determine whether to execute the mini game at least during the execution of the basic game. In a step (b4), the game controller is programmed to display the predetermined number of penalty-kick shoot-out images in the display, when it is determined to execute the mini game. In a step (b5), the game controller is programmed to add a point-number corresponding to the number of victory times to the accumulated point-number to update the accumulated point-number, when the penalty-kick shoot-out ends in victory. In a step (b6), the game controller is programmed to determine a game-number of a free game depending on the accumulated point-number after executing the mini game. In a step (b7), the game controller is programmed to execute the free game by the game-number.

In the gaming machine of the invention, when a basic game is started as a signal is received from an input device, a football game image is displayed in a display at least during execution of the basic game. Then, it is determined whether to execute a mini game at least during the execution of the basic game. When it is determined to execute the mini game, the predetermined number of penalty-kick shoot-out images is displayed in the display. When the penalty-kick shoot-out ends in victory, a point-number corresponding to the number of victory times is added to an accumulated point-number to update the accumulated point-number. As a result, a free game is executed by the game-number that is determined depending on the accumulated point-number after the mini game is executed, so that a gaming machine having new entertainment characteristics is realized.

The invention provides a gaming machine having structures as described below. The gaming machine comprises a display that displays an image, a memory that stores an accumulated point-number to be updated depending on an execution result of a mini game, an input device that outputs a signal to start a basic game and a game controller programmed to operate as described in steps (c1)~(c7).

Specifically, in a step (c1), the game controller is programmed to start the basic game or free game as the signal is received from the input device. In a step (c2), the game controller is programmed to determine whether to execute the mini game at least during execution of the basic game. In a step (c3), the game controller is programmed to display the predetermined number of penalty-kick shoot-out images in the display, when it is determined to execute the mini game. In a step (c4), the game controller is programmed to display a setting image enabling a player to determine at least one of a ball speed and a ball direction in the penalty-kick shoot-out. In a step (c5), the game controller is programmed to add a point-number corresponding to the number of victory times to the accumulated point-number to update the accumulated point-number, when the penalty-kick shoot-out ends in victory. In a step (c6), the game controller is programmed to determine a game-number of the free game depending on the accumulated point-number after executing the mini game. In a step (c7), the game controller is programmed to execute the free game by the game-number.

In the gaming machine of the invention, when a basic game or free game is started as a signal is received from an input device, it is determined whether to execute a mini game at least during execution of the basic game. When it is determined to execute the mini game, the predetermined number of penalty-kick shoot-out images is displayed in a display. In addition, it is displayed a setting image enabling a player to determine at least one of a ball speed and a ball direction in the penalty-kick shoot-out. When the penalty-kick shoot-out ends in victory, a point-number corresponding to the number of victory times is added to an accumulated point-number to update the accumulated point-number. As a result, the free game is executed by the game-number that is determined depending on the accumulated point-number after the mini game is executed, so that a gaming machine having new entertainment characteristics is realized.

The invention provides a gaming machine having structures as described below.

The gaming machine comprises a first display that displays an image, a second display that displays an image, a memory that stores an accumulated point-number to be updated depending on an execution result of a mini game, an input device that outputs a signal to start a basic game and a game controller programmed to operate as described in steps (d1)~(d8).

Specifically, in a step (d1), the game controller is programmed to start the basic game as the signal is received from the input device. In a step (d2), the game controller is programmed to display an image of the basic game in the first display. In a step (d3), the game controller is programmed to display a football game image in the second display at least during execution of the basic game. In a step (d4), the game controller is programmed to determine whether to execute the mini game at least during the execution of the basic game. In a step (d5), the game controller is programmed to display the predetermined number of penalty-kick shoot-out images together with the image of the basic game in the first display, when it is determined to execute the mini game. In a step (d6), the game controller is programmed to add a point-number corresponding to the number of victory times to the accumulated point-number to update the accumulated point-number, when the penalty-kick shoot-out ends in victory. In a step (d7), the game controller is programmed to determine a game-number of a free game depending on the accumulated point-number after executing the mini game. In a step (d8), the game controller is programmed to execute the free game by the game-number.

In the gaming machine of the invention, when a basic game is started as a signal is received from an input device, an image of the basic game is displayed in the first display. In addition, a football game image is displayed in a second display at least during execution of the basic game. Then, it is determined whether to execute a mini game at least during execution of the basic game. When it is determined to execute the mini game, the predetermined number of penalty-kick shoot-out images is displayed in the first display, together with the image of the basic game. In addition, when the penalty-kick shoot-out ends in victory, a point-number corresponding to the number of victory times is added to an accumulated point-number to update the accumulated point-number. As a result, a free game is executed by the game-number that is determined depending on the accumulated point-number after the mini game is executed, so that a gaming machine having new entertainment characteristics is realized.

The invention provides a gaming machine having structures as described below. The gaming machine comprises a display that displays an image, a memory that stores an accumulated point-number to be updated depending on an execution result of a mini game, an input device that outputs a signal to start a basic game and a game controller programmed to operate as described in steps (e1)~(e8).

Specifically, in a step (e1), the game controller is programmed to start the basic game as the signal is received from the input device. In a step (e2), the game controller is programmed to display a football game image in the display at least during execution of the basic game. In a step (e3), the game controller is programmed to determine whether to execute the mini game at least during the execution of the basic game. In a step (e4), the game controller is programmed to display the predetermined number of penalty-kick shoot-out images in the display, when it is determined to execute the mini game. In a step (e5), the game controller is programmed to display a setting image enabling a player to determine at least one of a ball speed and a ball direction in the penalty-kick shoot-out. In a step (e6), the game controller is programmed to add a point-number corresponding to the number of victory times to the accumulated point-number to update the accumulated point-number, when the penalty-kick shoot-out ends in victory. In a step (e7), the game controller is programmed to determine a game-number of a free game depending on the accumulated point-number after executing the mini game. In a step (e8), the game controller is programmed to execute the free game by the game-number.

In the gaming machine of the invention, when a basic game is started as a signal is received from an input device, it is displayed a football game image in the display at least during execution of the basic game. Then, it is determined whether to execute a mini game at least during the execution of the basic game. When it is determined to execute the mini game, the predetermined number of penalty-kick shoot-out images is displayed in the display. In addition, it is displayed a setting image enabling a player to determine at least one of a ball speed and a ball direction in the penalty-kick shoot-out. When the penalty-kick shoot-out ends in victory, a point-number corresponding to the number of victory times is added to an accumulated point-number to update the accumulated point-number. As a result, the free game is executed by the game-number that is determined depending on the accumulated point-number after the mini game is executed, so that a gaming machine having new entertainment characteristics is realized.

The invention provides a gaming machine having structures as described below. The gaming machine comprises a first display that displays an image, a second display that displays an image, a memory that stores an accumulated point-number to be updated depending on an execution result of a mini game, an input device that outputs a signal to start a basic game and a game controller programmed to operate as described in steps (f1)~(f9).

Specifically, in a step (f1), the game controller is programmed to start the basic game as the signal is received from the input device. In a step (f2), the game controller is programmed to display an image of the basic game in the first display. In a step (f3), the game controller is programmed to display a football game image in the second display at least during execution of the basic game. In a step (f4), the game controller is programmed to determine whether to execute the mini game at least during the execution of the basic game. In a step (f5), the game controller is programmed to display the predetermined number of penalty-kick shoot-out images together with the image of the basic game in the first display, when it is determined to execute the mini game. In a step (f6), the game controller is programmed to display, in the first display, a setting image enabling a player to determine at least one of a ball speed and a ball direction in the penalty-kick shoot-out. In a step (f7), the game controller is programmed to add a point-number corresponding to the number of victory times to the accumulated point-number to update the accumulated point-number, when the penalty-kick shoot-out ends in victory. In a step (f8), the game controller is programmed to determine a game-number of a free game depending on the accumulated point-number after executing the mini game. In a step (f9), the game controller is programmed to execute the free game by the game-number.

In the gaming machine of the invention, when a basic game is started as a signal is received from an input device, an image of the basic game is displayed in a first display. In addition, a football game image is displayed in a second display at least during execution of the basic game. Then, it is determined whether to execute a mini game at least during the execution of the basic game. When it is determined to execute the mini game, the predetermined number of penalty-kick shoot-out images is displayed in the first display, together with the image of the basic game. In addition, it is displayed in the first display a setting image enabling a player to determine at least one of a ball speed and a ball direction in the penalty-kick shoot-out. When the penalty-kick shoot-out ends in victory, a point-number corresponding to the number of victory times is added to an accumulated point-number to update the accumulated point-number. As a result, a free game is executed by the game-number that is determined depending on the accumulated point-number after the mini game is executed, so that a gaming machine having new entertainment characteristics is realized.

The invention provides a gaming machine having structures as described below. The gaming machine comprises a first display that displays an image, a second display that displays an image, a memory that stores an accumulated point-number to be updated depending on an execution result of a mini game, an input device that outputs a signal to start a basic game or free game shifted from the basic game and a game controller programmed to operate as described in steps (g1)~(g9).

Specifically, in a step (g1), the game controller is programmed to start the basic game or free game as the signal is received from the input device. In a step (g2), the game controller is programmed to display an image of the basic game or free game in the first display. In a step (g3), the game controller is programmed to display a football game image in the second display during execution of the basic game or free game. In a step (g4), the game controller is programmed to determine whether to execute the mini game at least during the execution of the basic game or free game. In a step (g5), the game controller is programmed to display the predetermined number of penalty-kick shoot-out images together with the image of the basic game or free game in the first display, when it is determined to execute the mini game. In a step (g6), the game controller is programmed to display, in the first display, a setting image enabling a player to determine at least one of a ball speed and a ball direction in the penalty-kick shoot-out. In a step (g7), the game controller is programmed to add a point-number corresponding to the number of victory times to the accumulated point-number to update the accumulated point-number, when the penalty-kick shoot-out ends in victory. In a step (g8), the game controller is programmed to determine a game-number of the free game depending on the accumulated point-number after executing the mini game. In a step (g9), the game controller is programmed to execute the free game by the game-number.

In the gaming machine of the invention, when a basic game or free game is started as a signal is received from an input device, an image of the basic game or free game is displayed in a first display. In addition, a football game image is displayed in a second display at least during execution of the basic game or free game. Then, it is determined whether to execute a mini game at least during the execution of the basic game or free game. When it is determined to execute the mini game, the predetermined number of penalty-kick shoot-out images is displayed in the first display, together with the image of the basic game or free game. In addition, it is displayed in the first display a setting image enabling a player to determine at least one of a ball speed and a ball direction in the penalty-kick shoot-out. When the penalty-kick shoot-out ends in victory, a point-number corresponding to the number of victory times is added to an accumulated point-number to update the accumulated point-number. As a result, a free game is executed by the game-number that is determined depending on the accumulated point-number after the mini game is executed, so that a gaming machine having new entertainment characteristics is realized.

BRIEF DESCRIPTION OF THE DRAWINGS

FIG. 6 is a data table showing symbols and code numbers of the symbols;

FIG. 7 shows a data table of a payout management table;

FIG. 8 shows a data table of a free game-number table;

FIG. 9 shows a data table of a mini game start determining table;

FIG. 10 shows a data table of a mini game result determining table;

DESCRIPTION OF THE PREFERRED EMBODIMENTS

Hereinafter, an embodiment of a gaming machine according to the invention will be described.

(Outline of a Gaming Machine)

Figure 1:
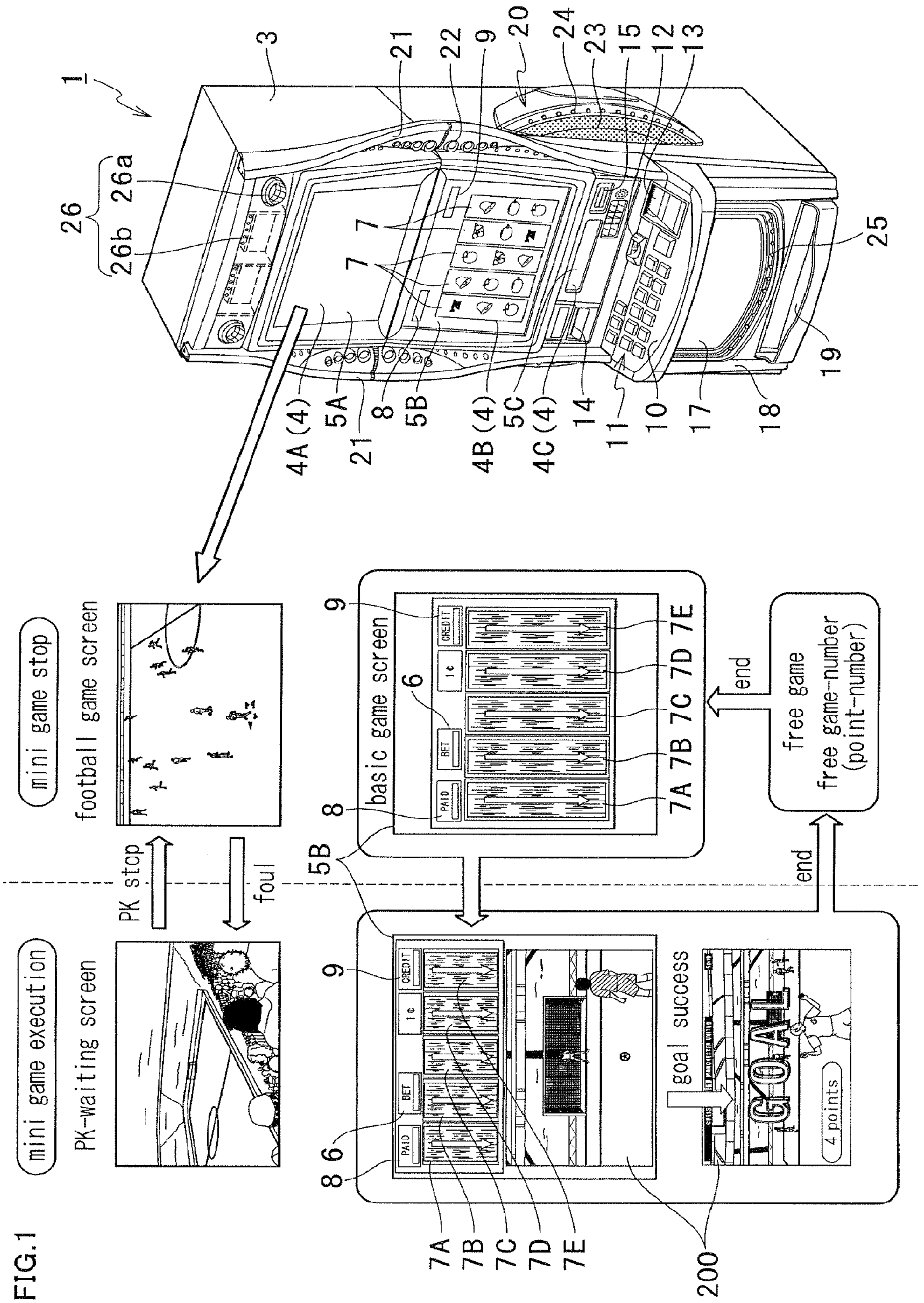
FIG. 1 illustrates a playing method of a gaming machine.
Figure 4:
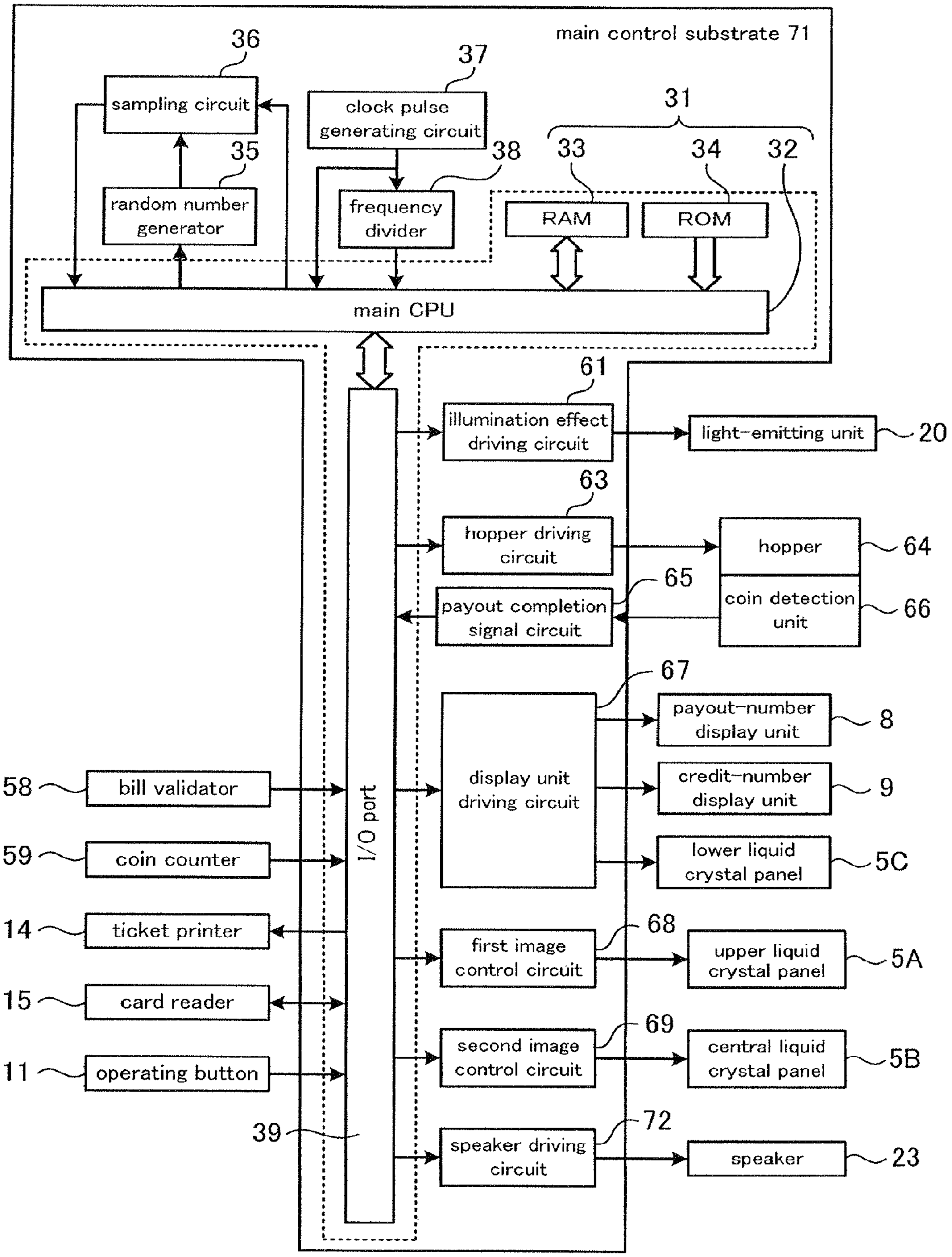
FIG. 4 is a block diagram showing a control circuit of a gaming machine.

As shown in FIGS. 1 and 4, a gaming machine (slot machine) 1 comprises a display (upper variable display unit 4A, central variable display unit 4B and the like) that displays an image, a memory (RAM 33) that stores an accumulated point-number to be updated depending on an execution result of a mini game, an input device (operating button 11) that outputs a signal to start a basic game and a game controller (main CPU 32) programmed to operate as described in steps (a1)~(a6).

Specifically, in a step (a1), the game controller is programmed to start the basic game as the signal is received from the input device. In a step (a2), the game controller is programmed to determine whether to execute the mini game at least during execution of the basic game. In a step (a3), the game controller is programmed to display the predetermined number of penalty-kick shoot-out images in the display, when it is determined to execute the mini game. In a step (a4), the game controller is programmed to add a point-number corresponding to the number of victory times to the accumulated point-number to update the accumulated point-number, when the penalty-kick shoot-out ends in victory. In a step (a5), the game controller is programmed to determine a game-number of a free game depending on the accumulated point-number after executing the mini game. In a step (a6), the game controller is programmed to execute the free game by the game-number.

Thereby, the gaming machine executes a gaming method comprising steps of starting a basic game as a signal is received from an input device; determining whether to execute a mini game at least during execution of the basic game; displaying the predetermined number of penalty-kick shoot-out images in a display, when it is determined to execute the mini game; adding a point-number corresponding to the number of victory times to an accumulated point-number to update the accumulated point-number, when the penalty-kick shoot-out ends in victory; and executing a free game by a game-number determined depending on the accumulated point-number after executing the mini game.

(Definition)

Herein, the "gaming machine" may be a slot machine 1 for a single player or may be a multiplayer-type gaming machine that allows participation of two or more players. For example, the multiplayer-type gaming machine may consist of several slot machines 1 that are connected to each other in a data communication manner. In addition, the gaming machine may execute any of a mechanically operating game, an electrically operating game and a mechanically and electrically operating game. As the mechanically operating game, there is a slot machine 1 having reels that are realistically manufactured. In addition, as the electrically operating game, there is a slot machine 1 that displays a reel image in a display device such as liquid crystal monitor and virtually rotates or moves the reel. Meanwhile, in this embodiment, the invention provides the slot machine 1 as the gaming machine. However, it should be noted that the invention is not limited thereto.

The "display" may include a liquid crystal display device, a CRT (cathode-ray tube) device, a plasma display device and the like. In addition, a single or several displays may be provided to the slot machine 1. Moreover, in the case of the multiplayer-type gaming machine, the display may be respectively provided to each of the slot machines 1. Alternatively, a large-scale display that is commonly used for all the slot machines 1 may be provided separately from the slot machines 1.

The "basic game" is an original main game of the gaming machine and a game that is executed in a base game state. For example, in the slot machine 1, the basic game is a slot game that is executed in a general game state. Meanwhile, the slot game is a game in which symbols are variably stopped and a game value is awarded depending on a stop display result. In the mean time, the "game value" includes a medal, coin, gaming ball, money, bill, magnetic card the like.

The "mini game" is a sub-game that is different from the original main game of the gaming machine and is executed simultaneously with the basic game or executed at one time period during a stop period of the basic game. For example, in this embodiment, the mini game is a penalty-kick shoot-out game that is executed during execution of the slot game.

Figure 16:
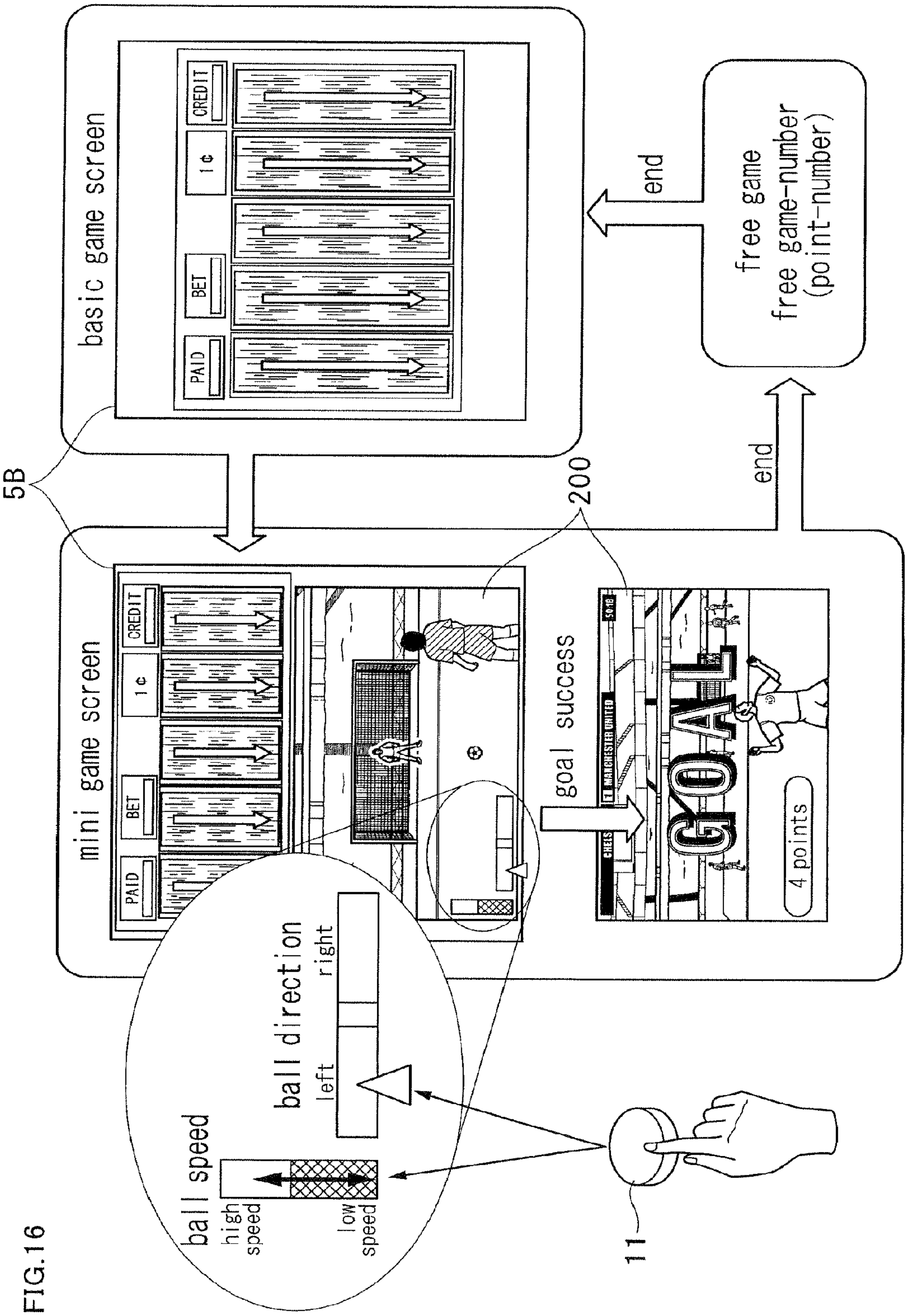
FIG. 16 illustrates a playing method of a gaming machine.

In the mean time, in the penalty-kick shoot-out, a penalty-kick may be continuously carried out in an automatic manner and it is possible to adjust a direction or intensity that a player kicks a ball. In other words, as shown in FIG. 16, it is provided a button for determining a ball speed or ball direction, as a type of operating buttons 1. A player determines a ball direction and then operates the operating button 11 to correspond to a bar display that vertically moves in a range of low and high speeds, thereby determining a ball speed directing to a goal. In this case, it is possible to provide the player with an interest that the player will take part in a mini game.

The "free game" is a game in which a player can play a game over the predetermined number of times without betting a coin. The free game is a type of a bonus game. The bonus game is a gaming state that is more advantageous than the basic game. Meanwhile, the bonus game is not particularly limited as long as it is a gaming state that is advantageous to a player, i.e., it is more advantageous than the basic game. For example, the bonus game may include a state in which more game media can be acquired than in the basic game, a state in which a game medium can be acquired in a higher probability than the basic game, a state in which the game medium is less consumed than in the basic game and the like.

The "point" is generated as a result that a mini game ends in success. The number of points has an effect on the free game-number. A pay line L, symbols 180, a winning combination and the golf game will be specifically described below.

In addition, the game controller may be structured to operate programs of steps (b1)~(b7)

In a step (b1), the game controller is programmed to start a basic game as a signal is received from an input device. In a step (b2), the game controller is programmed to display a football game image in a display during execution of the basic game. In a step (b3), the game controller is programmed to determine whether to execute the mini game at least during the execution of the basic game. In a step (b4), the game controller is programmed to display the predetermined number of penalty-kick shoot-out images in the display, when it is determined to execute the mini game. In a step (b5), the game controller is programmed to add a point-number corresponding to the number of victory times to the accumulated point-number to update the accumulated point-number, when the penalty-kick shoot-out ends in victory. In a step (b6), the game controller is programmed to determine a game-number of a free game depending on an accumulated point-number after executing the mini game. In a step (b7), the game controller is programmed to execute the free game by the game-number.

Thereby, the gaming machine executes a playing method comprising steps of starting a basic game as a signal is received from an input device; displaying a football game image in a display during execution of the basic game; determining whether to execute the mini game at least during the execution of the basic game; displaying the predetermined number of penalty-kick shoot-out images in the display, when it is determined to execute the mini game; adding a point-number corresponding to the number of victory times to an accumulated point-number to update the accumulated point-number, when the penalty-kick shoot-out ends in victory; and executing a free game by a game-number determined depending on the accumulated point-number after executing the mini game.

In addition, the game controller may be structured to operate programs of steps (c1)~(c7).

In a step (c1), the game controller is programmed to start a basic game or free game as a signal is received from an input device. In a step (c2), the game controller is programmed to determine whether to execute a mini game at least during execution of the basic game. In a step (c3), the game controller is programmed to display the predetermined number of penalty-kick shoot-out images in the display, when it is determined to execute the mini game. In a step (c4), the game controller is programmed to display a setting image enabling a player to determine at least one of a ball speed and a ball direction in the penalty-kick shoot-out. In a step (c5), the game controller is programmed to add a point-number corresponding to the number of victory times to an accumulated point-number to update the accumulated point-number, when the penalty-kick shoot-out ends in victory. In a step (c6), the game controller is programmed to determine a game-number of a free game depending on the accumulated point-number after executing the mini game. In a step (c7), the game controller is programmed to execute the free game by the game-number.

Thereby, the gaming machine executes a gaming method comprising steps of starting a basic game or free game as a signal is received from an input device; determining whether to execute a mini game at least during execution of the basic game; displaying the predetermined number of penalty-kick shoot-out images in the display, when it is determined to execute the mini game; displaying a setting image enabling a player to determine at least one of a ball speed and a ball direction in the penalty-kick shoot-out; adding a point-number corresponding to the number of victory times to the accumulated point-number to update the accumulated point-number, when the penalty-kick shoot-out ends in victory; and executing a free game by a game-number determined depending on the accumulated point-number after executing the mini game.

In addition, the game controller may be structured to operate programs of steps (d1)~(d8).

In a step (d1), the game controller is programmed to start a basic game as a signal is received from an input device. In a step (d2), the game controller is programmed to display an image of the basic game in a first display. In a step (d3), the game controller is programmed to display a football game image in a second display at least during execution of the basic game. In a step (d4), the game controller is programmed to determine whether to execute the mini game at least during the execution of the basic game. In a step (d5), the game controller is programmed to display the predetermined number of penalty-kick shoot-out images together with the image of the basic game in the first display, when it is determined to execute the mini game. In a step (d6), the game controller is programmed to add a point-number corresponding to the number of victory times to an accumulated point-number to update the accumulated point-number, when the penalty-kick shoot-out ends in victory. In a step (d7), the game controller is programmed to determine a game-number of a free game depending on the accumulated point-number after executing the mini game. In a step (d8), the game controller is programmed to execute the free game by the game-number.

Thereby, the gaming machine executes a gaming method comprising steps of starting a basic game as a signal is received from an input device; displaying an image of the basic game in a first display; displaying a football game image in a second display at least during execution of the basic game; determining whether to execute a mini game at least during the execution of the basic game; displaying the predetermined number of penalty-kick shoot-out images together with the image of the basic game in the first display, when it is determined to execute the mini game; adding a point-number corresponding to the number of victory times to the accumulated point-number to update the accumulated point-number, when the penalty-kick shoot-out ends in victory; and executing a free game by a game-number determined depending on the accumulated point-number after executing the mini game.

In addition, the game controller may be structured to operate programs of steps (e1)~(e8).

In a step (e1), the game controller is programmed to start a basic game as a signal is received from an input device. In a step (e2), the game controller is programmed to display a football game image in a display at least during execution of the basic game. In a step (e3), the game controller is programmed to determine whether to execute a mini game at least during execution of the basic game. In a step (e4), the game controller is programmed to display the predetermined number of penalty-kick shoot-out images in the display, when it is determined to execute the mini game. In a step (e5), the game controller is programmed to display a setting image enabling a player to determine at least one of a ball speed and a ball direction in the penalty-kick shoot-out. In a step (e6), the game controller is programmed to add a point-number corresponding to the number of victory times to an accumulated point-number to update the accumulated point-number, when the penalty-kick shoot-out ends in victory. In a step (e7), the game controller is programmed to determine a game-number of a free game depending on the accumulated point-number after executing the mini game. In a step (e8), the game controller is programmed to execute the free game by the game-number.

Thereby, the gaming machine executes a gaming method comprising steps of starting a basic game as a signal is received from an input device; displaying a football game image in a display at least during execution of the basic game; determining whether to execute a mini game at least during execution of the basic game; displaying the predetermined number of penalty-kick shoot-out images in the display, when it is determined to execute the mini game; displaying a setting image enabling a player to determine at least one of a ball speed and a ball direction in the penalty-kick shoot-out; adding a point-number corresponding to the number of victory times to an accumulated point-number to update the accumulated point-number, when the penalty-kick shoot-out ends in victory; and executing a free game by a game-number determined depending on the accumulated point-number after executing the mini game.

In addition, the game controller may be structured to operate programs of steps (f1)~(f9).

In a step (f1), the game controller is programmed to start a basic game as a signal is received from the input device. In a step (f2), the game controller is programmed to display an image of the basic game in a first display. In a step (f3), the game controller is programmed to display a football game image in a second display at least during execution of the basic game. In a step (f4), the game controller is programmed to determine whether to execute a mini game at least during the execution of the basic game. In a step (f5), the game controller is programmed to display the predetermined number of penalty-kick shoot-out images together with the image of the basic game in the first display, when it is determined to execute the mini game. In a step (f6), the game controller is programmed to display, in the first display, a setting image enabling a player to determine at least one of a ball speed and a ball direction in the penalty-kick shoot-out. In a step (f7), the game controller is programmed to add a point-number corresponding to the number of victory times to an accumulated point-number to update the accumulated point-number, when the penalty-kick shoot-out ends in victory. In a step (f8), the game controller is programmed to determine a game-number of a free game depending on the accumulated point-number after executing the mini game. In a step (f9), the game controller is programmed to execute the free game by the game-number.

Thereby, the gaming machine executes a gaming method comprising steps of starting a basic game as a signal is received from the input device; displaying an image of the basic game in a first display; displaying a football game image in a second display at least during execution of the basic game; determining whether to execute a mini game at least during the execution of the basic game; displaying the predetermined number of penalty-kick shoot-out images together with the image of the basic game in the first display, when it is determined to execute the mini game;

displaying, in the first display, a setting image enabling a player to determine at least one of a ball speed and a ball direction in the penalty-kick shoot-out, adding a point-number corresponding to the number of victory times to an accumulated point-number to update the accumulated point-number, when the penalty-kick shoot-out ends in victory; and executing a free game by a game-number determined depending on the accumulated point-number after executing the mini game.

In addition, the game controller may be structured to operate programs of steps (g1)~(g9).

In a step (g1), the game controller is programmed to start a basic game or free game as a signal is received from an input device. In a step (g2), the game controller is programmed to display an image of the basic game or free game in a first display. In a step (g3), the game controller is programmed to display a football game image in a second display during execution of the basic game or free game. In a step (g4), the game controller is programmed to determine whether to execute a mini game at least during the execution of the basic game or free game. In a step (g5), the game controller is programmed to display the predetermined number of penalty-kick shoot-out images together with the image of the basic game or free game in the first display, when it is determined to execute the mini game. In a step (g6), the game controller is programmed to display, in the first display, a setting image enabling a player to determine at least one of a ball speed and a ball direction in the penalty-kick shoot-out. In a step (g7), the game controller is programmed to add a point-number corresponding to the number of victory times to an accumulated point-number to update the accumulated point-number, when the penalty-kick shoot-out ends in victory. In a step (g8), the game controller is programmed to determine a game-number of the free game depending on the accumulated point-number after executing the mini game. In a step (g9), the game controller is programmed to execute the free game by the game-number.

Thereby, the gaming machine executes a gaming method comprising steps of start a basic game or free game as a signal is received from an input device; displaying an image of the basic game or free game in a first display; displaying a football game image in a second display during execution of the basic game or free game; determining whether to execute a mini game at least during the execution of the basic game or free game; displaying the predetermined number of penalty-kick shoot-out images together with the image of the basic game or free game in the first display, when it is determined to execute the mini game; displaying, in the first display, a setting image enabling a player to determine at least one of a ball speed and a ball direction in the penalty-kick shoot-out; adding a point-number corresponding to the number of victory times to an accumulated point-number to update the accumulated point-number, when the penalty-kick shoot-out ends in victory; and executing a free game by a game-number determined depending on the accumulated point-number after executing the mini game.

(Mechanical Structure)

Figure 2:
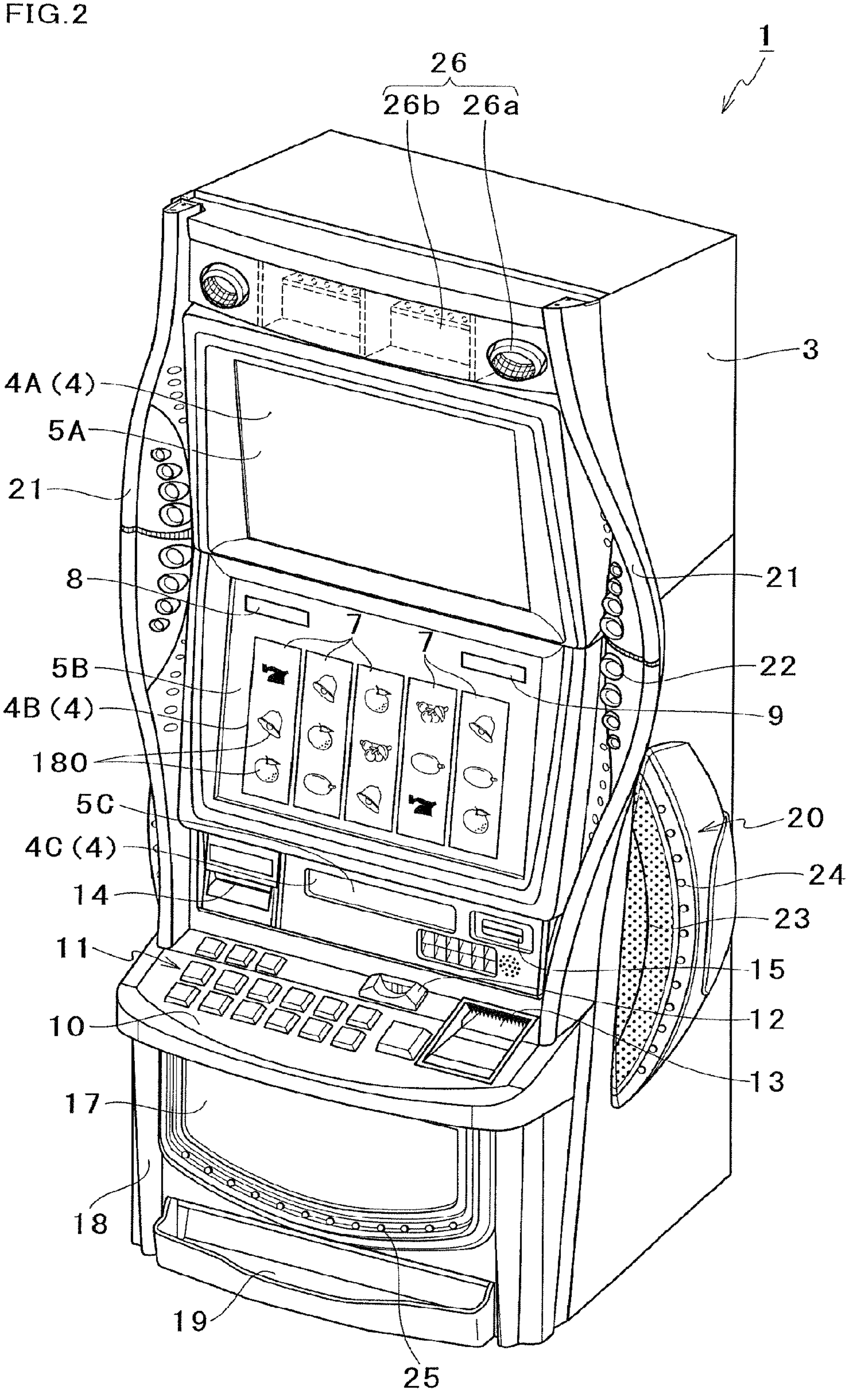
FIG. 2 is a perspective view showing an external appearance of a gaming machine.

In the followings, it is described an example of the gaming machine that is structured as a slot machine 1. As shown in FIGS. 1 and 2, the slot machine 1 is an upright-type slot machine and has a cabinet 3 for accommodating electrical or mechanical parts that are provided to execute a predetermined game. The cabinet 3 has a shape that is long in a vertical direction. A display 4 is provided to a front side opposite to a player at the cabinet 3. The display 4 displays game information based on a game operation of a player, a basic game and a mini game.

Specifically, the display has a variable display unit 4A that is disposed at an upper part, a variable display unit 4B that is disposed at a central part and a variable display unit 4C that is disposed at a lower part. The upper variable display unit 4A has an upper transparent liquid crystal panel 5A. The upper liquid crystal panel 5A is fixed to a front door of the cabinet 3. A football game screen or PK-waiting screen in a basic game, a mini game and a free game is displayed in the upper liquid crystal panel 5A. In other words, the upper liquid crystal panel 5A displays a football game screen during the stopping period of the mini game while it displays a PK-waiting screen during execution of the mini game.

The central variable display unit 4B is a rotating symbol display panel that a player always observes closely, and has a central transparent liquid crystal panel 5B that is fixed to the front door of the cabinet 3. Five display windows 7A, 7B, 7C, 7D, 7E are displayed in the central liquid crystal panel 5B. The display windows 7A, 7B, 7C, 7D, 7E are displayed in an overall screen when a mini game is not executed. In the mean time, when the mini game is executed, the display windows 7A, 7B, 7C, 7D, 7E are displayed in an upper-half part of the screen.

Figure 3:
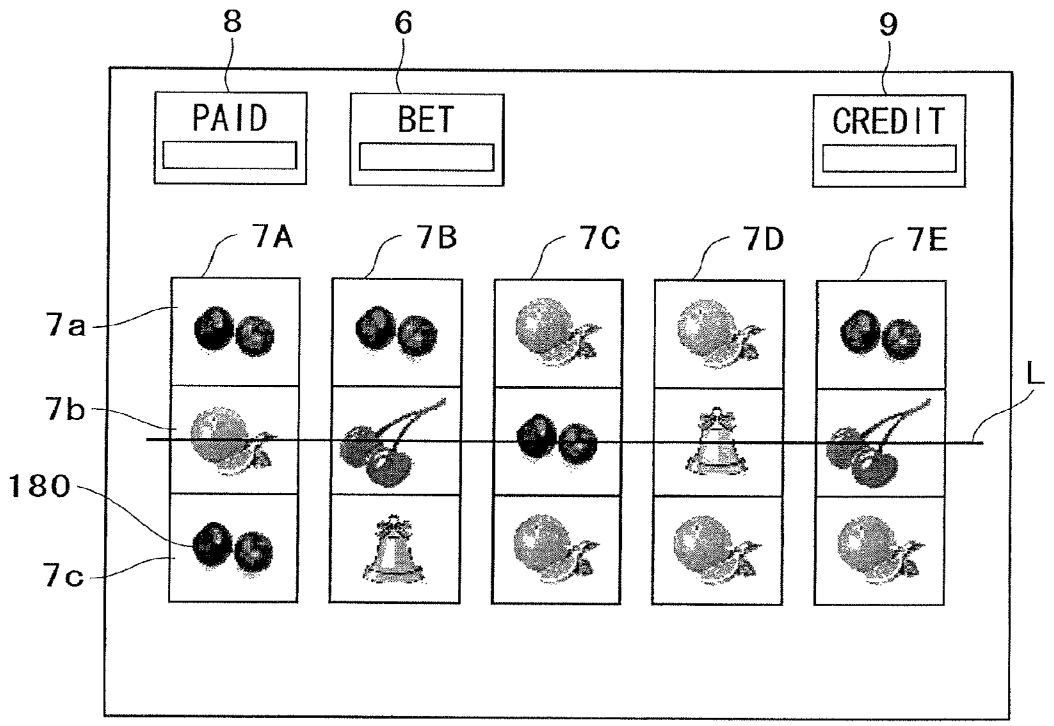
FIG. 3 illustrates a display screen.

In addition, as shown in FIG. 3, a single pay line L is displayed in the central liquid crystal panel 5B. The pay line L horizontally traverses the five display windows 7A, 7B, 7C, 7D, 7E. Herein, the "pay line" is provided to determine a combination of the symbols 180. In other words, when the symbols 180 are rearranged on and out of the pay line L, a combination is determined for only the symbols 180 rearranged on the pay line. As a result of the determination for a combination, when it is made a winning combination, it is carried out, for example, a process of paying out a coin based on the winning combination.

The central liquid crystal panel 5B carries out an effect such as moving picture when a winning is made, for example. In addition, a bet-number display unit 6, a payout-number display unit 8 and a credit-number display unit 9 are displayed in an upper part of the central liquid crystal panel 5B. Furthermore, an effect screen of a penalty-kick shoot-out is displayed in the central liquid crystal panel 5B when a mini game is executed. The effect screen is displayed in a lower-half part of a screen. As a result, when a mini game is executed, the display windows 7A, 7B, 7C, 7D, 7E and the penalty-kick shoot-out are respectively displayed in the upper and lower areas. Thereby, a player can watch a penalty-kick shoot-out of the mini game while playing a slot game by the display windows 7A, 7B, 7C, 7D, 7E.

The lower variable display unit 4C has a lower liquid crystal panel 5C that displays a point-number recorded in a card or a game point-number. The numerical value displayed in the lower liquid crystal panel 5C is based on a display result of the central variable display unit 4B. When a winning combination is made in the central variable display unit 4B, the game point-number that is displayed in the lower liquid crystal panel 5C is added on the basis of the winning combination made. A ticket printer 14 is provided to a left side of the lower liquid crystal panel 5C. In the mean time, a card reader 15 is provided to a right side of the lower liquid crystal panel 5C.

An operating table 10 that protrudes from the front face of the cabinet 3 is disposed below the lower variable display unit 5C. On the operating table 10, there are arranged operating buttons 11 (for example, bet button, collect button, start button, stop button and the like) as an operating unit enabling a player to operate a game. In addition, a coin insertion slot 12 and a bill insertion slot 13 are provided to the operating table 10.

A waist-position panel 17 is disposed below the operating table 10. The waist-position panel 17 is a plastic panel having a game-related image printed thereto. The waist-position panel 17 is fixed to a lower front door 18 and illuminated by a cold cathode-ray tube. In addition, a coin tray 19 that collects coins, which are paid out on the basis of a game result, is disposed below the waist-position panel 17.

In addition, the cabinet 3 is provided with a light-emitting unit 20 of FIG. 4. The light-emitting unit 20 consists of many lamps including side lamps 22, speaker lamps 24, under lamps 25 and top lamps 26 and are disposed to surround a game area including the upper variable display unit 4A, the central variable display unit 4B, the lower variable display unit 4C and the operating table 10.

The side lamps 22 are provided to inclined parts 21.21. The inclined parts 21•21 are respectively disposed at front right and left ends of the cabinet 3. The inclined parts 21•21 are disposed to interpose the upper variable display unit 4A, the central variable display unit 4B and the lower variable display unit 4C and are formed into a shape that is protruded in a bow shape.

In addition, the speaker lamps 24 are protruded from both ends of the cabinet 3 adjacent to the operating table 10. The speaker lamps 24 are provided to arc-shaped speakers 23 and arranged along edges of the speakers 23. The under lamps 25 are provided to the lower front door 18 and arranged along lower edges of the waist-position panel 17. The top lamps 26 are provided to an upper part of the upper variable display unit 4A. The top lamps 26 have power lamps *26a•26a* disposed at both sides and central band-shaped lamps *26b* arranged in a horizontal direction.

(Electrical Structure)

FIG. 4 is a block diagram showing an overall electrical structure of the slot machine 1. As shown in FIG. 4, the slot machine 1 has many components about a main control substrate 71 including a microcomputer 31. The main control substrate 71 has a microcomputer 31, a random number generator 35, a sampling circuit 36, a clock pulse generating circuit 37, a frequency dividing circuit 38, an illumination effect driving circuit 61, a hopper driving circuit 63, a payout completion signal circuit 65, a display unit driving circuit 67, a first image control circuit 68, a second control circuit 69 and a speaker dividing circuit 72.

The microcomputer 31 has a main CPU 32, a RAM 33 and a ROM 34. The main CPU 32 operates in accordance with a program stored in the ROM 34 and executes an input/output of a signal to and from the other components, thereby controlling an overall operation of the slot machine 1. The RAM 33 serves as a temporary storage means when the main CPU 32 operates. The ROM 34 stores data or program used when the main CPU 32 operates. For example, a random number value that is sampled by the sampling circuit 36 is temporarily maintained in the ROM after a game starts. In addition, a payout management table shown in FIG. 7 and a free game-number table shown in FIG. 8 are stored in the ROM. In addition to, the ROM 34 stores a program that is executed by the main CPU 32 and permanent data.

The random number generator 35 is operated in accordance with an instruction of the main CPU 32 and generates a random number within a predetermined range. The sampling circuit 36 samples any random number of the random numbers that are generated by the random number generator 35 in accordance with an instruction of the main CPU 32 and inputs the sampled random number into the main CPU 32. The clock pulse generating circuit 37 generates a reference clock for operating the main CPU 32 and the frequency dividing circuit 38 inputs a signal that the reference clock is divided in a predetermined period to the main CPU 32.

In addition, the main control substrate 71 is connected with the operating buttons 11 including a stop button for inputting an instruction to stop the scroll of the symbol rows, a start button, a collect button, a bet button and the like and allows signals corresponding to the push of the buttons to be inputted into the main CPU 32 via the I/O port 39.

In addition, the main control substrate 71 is connected with a bill validator 58, a coin counter 59, a ticket printer 14 and a card reader 15.

The bill validator 58 reads an image of bill inserted into the bill insertion slot 13 and receives the normal bill in the cabinet 3. In addition, when receiving the normal bill, the bill validator 58 outputs an input signal to the main CPU 32 based on an amount of the bill. The main CPU 32 stores a credit-number in the RAM 33, which corresponds to the amount of bill transmitted by the input signal.

The coin counter 59 is provided in the coin insertion slot 12 and identifies whether the coin inserted into the coin insertion slot 12 is normal or not. The abnormal coin is discharged to the coin tray 19. In addition, the coin counter 59 outputs an input signal to the main CPU 32 when it detects a normal coin.

The ticket printer 14 prints a barcode on a ticket, in which data such as credit-number stored in the RAM 33, the day and time and identification number of the slot machine 1 is coded, based on the control signal outputted from the main CPU 32, and then outputs a ticket having the barcode.

The card reader 15 reads the data from a smart card to transmit it to the main CPU 32, or writes the data to the smart card based on a control signal from the main CPU 32.

The illumination effect driving circuit 61 outputs an effect signal that causes the light-emitting unit 20 to execute an illumination effect. The light-emitting unit 20 consists of many lamps or LED including the side lamps 22, the speaker lamps 24, the under lamps 25 and the top lamps 26.

The hopper driving circuit 63 drives a hopper 64 under control of the main CPU 32. The hopper 64 executes an operation of paying out a coin and pays out the coin to the coin tray 19. The payout completion signal circuit 65 inputs data of the coin-number from a coin detection unit 66 connected thereto and inputs a signal, which notifies payout completion of the coin when the coin-number reaches a predetermined number, to the main CPU 32. The coin detection unit 66 measures the number of coins paid out by the hopper 64 and inputs data of the measured number to the payout completion signal circuit 65. The display unit driving circuit 67 controls display operations of various display units such as payout-number display unit 8, credit-number display unit 9 and lower liquid crystal panel 5C.

The first image control circuit 68 and the second image control circuit 69 have a same structure. The first image control circuit 68 displays an effect screen in the upper liquid crystal panel 5A and the second image control circuit 69 displays the symbols 180 or mini game screen 200 of the penalty-kick shoot-out in the central liquid crystal panel 5B. The speaker driving circuit 72 controls the voice output by the speakers 23. The image control circuits 68, 69 will be described later.

The main CPU 32 executes a control of outputting a command signal, which causes the symbols 180 displayed in the central liquid crystal panel 5B to be scrolled when a credit is bet and then the start button is pushed, to the second image control circuit 69, a control of determining symbols that are stopped after the symbols 180 are scrolled and a control of stopping the determined symbols in the display windows 7A, 7B, 7C, 7D, 7E.

In other words, the main CPU 32 has functions of an arrangement controller for executing an arrangement control of selecting symbols to be arranged into a symbol matrix from many types of symbols and stopping the symbols in the symbol matrix from a scroll state, so as to rearrange the displayed symbols 180 as the symbol matrix after scrolling the symbols 180 displayed in the central liquid crystal panel 5B. Herein, the "arrangement" means a state in which an outside player can identify the symbols 180 with naked eyes. Meanwhile, the "rearrangement" is meant by arranging the symbols 180 again after dismissing the arrangement of the symbols 180.

The second image control circuit 69 will be described in detail. Meanwhile, since the first image control circuit 68 is same as the second image control circuit 69, its description is omitted.

Figure 5:
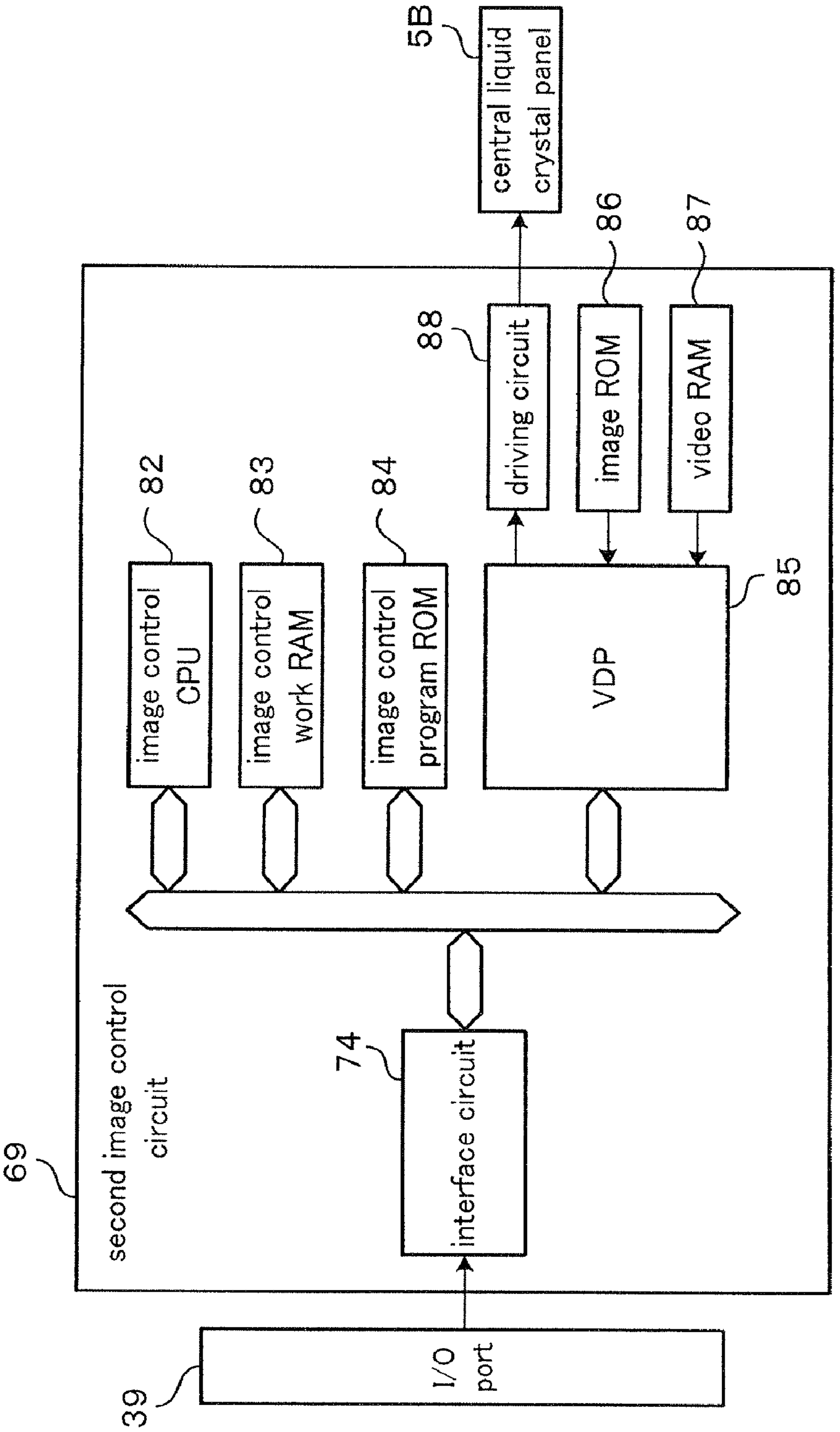
FIG. 5 is a block diagram showing a first image control circuit.

As shown in FIG. 5, the second image control circuit 69 controls the display of the central liquid crystal panel 5B of the variable display unit 4B. The second image control circuit 69 has an interface circuit 74 that is connected to the I/O port 39, an image control CPU 82, an image control work RAM 83, an image control program ROM 84, a VDP (Video Display Processor) 85, an image ROM 86, a video RAM 87 and a driving circuit 88.

The image control CPU 82 determines an image that is displayed in the central liquid crystal panel 5B in accordance with an image control program stored in the image control program ROM 84, based on parameters set in the microcomputer 31.

The image control program ROM 84 stores the image control program relating to the display in the central liquid crystal panel 5B or a variety of selection tables. The image control work RAM 83 serves as a temporary storage means when the image control program is executed in the image control CPU 82. The VDP 85 forms an image in accordance with a content determined in the image control CPU 82 and outputs the image to the central liquid crystal panel 5B. The image ROM 86 stores dot data for forming an image. The video RAM 87 serves as a temporary storage means when the VDP 85 forms an image. The driving circuit 88 controls the display of the central liquid crystal panel 5B, based on the VDP 85.

(Symbol, Combination and the Like)

The symbols 180 to be displayed in the display windows 7A, 7B, 7C, 7D, 7E of the slot machine 1 constitute columns of symbols, each of which consists of 22 symbols. The symbols constituting the respective columns of symbols are given with one code number of 0~21, as shown in FIG. 6. Each of the columns of symbols is constituted with a combination of symbols of "JACKPOT 7, " "BLUE 7, " "BELL," "CHERRY," "STRAWBERRY," "PLUM," "ORANGE" and "APPLE."

The three successive symbols in the columns of symbols are displayed (arranged) in the upper, center and lower stages 7*a*, 7*b*, 7*c* of the respective display windows 7A, 7B, 7C, 7D, 7E, respectively, so that they constitute a symbol matrix of 5 colums/3 rows. When the bet button is pushed and then the start button is pushed to start a game, the symbols constituting the symbol matrix start the scroll. When a predetermined time period elapses after the scroll starts, the scrolls of the respective symbols are stopped (rearranged).

In addition, various winning combinations are predetermined with regard to the respective symbols. The winning combination is a combination that a combination of symbols stopped on the pay line L becomes an advantageous state to the player. The advantageous state is a state in which a coin is paid out in accordance with the winning combination, a state in which the payout-number of coins is added to a credit, a state in which a bonus game is started, and the like.

Specifically, when a combination of "APPLE" symbol is stopped on the pay line L, a bonus is triggered and a gaming state is shifted to a bonus game from a basic game. In addition, when a combination of "CHERRY" symbol is stopped on the pay line L in the basic game, 20 coins (values) are paid out per one bet. When a combination of "PLUM" symbol is stopped on the pay line L in the basic game, 5 coins are paid out per one bet.

In the mean time, a bonus game is a gaming state that is more advantageous than the basic game. In addition, when a gaming state is advantageous to a player, i.e., a gaming state is more advantageous than the basic game; the other bonus game may be further adopted. For example, a state in which it is possible to obtain more coins than the basic game, a state in which it is possible to obtain a coin in a higher probability than in the basic game, a state in which the coin is less consumed than in the basic game, a free game and the like may be adopted as the other bonus game.

In the followings, each table stored in the ROM 34 of the main control substrate 71 is described with reference to FIGS. 7 to 10.

(Payout Management Table)

FIG. 7 shows a payout management table managing a payout that is awarded on the basis of a winning combination. The payout management table is stored in the ROM 34 of the main control substrate 71 and the payout information is matched to a type of the winning combination. For example, a payout corresponding to a winning combination of "BELL" is "10. " A payout corresponding to a winning combination of "BLUE 7" is "40. " In addition, in this embodiment, the payouts in the basic game and the free game are set to be same.

(Free Game-Number Table)

FIG. 8 shows a table that is referred to, when determining a free game-number for a point-number acquired in a mini game of the basic game. In the free game-number table, a point-number awarded in a mini game is matched to a free game-number. For example, when an accumulated point is "4," "80" free games are executed. In addition, when an accumulated point is "8," "160" free games are executed. Like this, when a mini game of the basic game ends in success and more points are thus acquired, a player can continue the free game for a long time.

(Mini Game Start Determining Table)

FIG. 9 shows a table that is referred to when determining whether to start a mini game. The mini game is started approximately at the same time when the operating button 11 (start button) is pushed and the symbols 180 are scrolled. In the mini game start determining table, for each of the basic game and the free game, the random numbers are respectively allotted to a case where a mini game is started and a case where a mini game is not started. For example, in the basic game, when the random number of "0~156" is sampled, a mini game is started and when the random number of "157~256" is sampled, a mini game is not started. In addition, in the free game, when the random number of "0~199" is sampled, a mini game is started and when the random number of "200~256" is sampled; a mini game is not started.

In the mean time, the mini game may be started in only one of the basic game and the free game, or may be started in the bonus game.

(Mini Game Result Determining Table)

FIG. 10 shows a table that is referred to when a player does not push the operating button 11 (start button) in the mini game. In the mini game of this embodiment, it is determined whether the mini game ends in success, based on the operation of the player. When a player does not carry out the operation for a predetermined time period, for example until the symbols 180 being scrolled are stopped, a mini game result is randomly determined. In the mini game result determining table of FIG. 10, the random numbers are respectively allotted to a case where the mini game ends in success and a case where the mini game results in failure. For example, when the random number of "0~200" is sampled, the mini game ends in failure and when the random number of "201~256" is sampled, the mini game ends in success. In other words, when a player does not carry out an operation in a mini game, a probability that the mini game will end in success is lower.

(Display State)

An example of a display state of the display 4 (specifically, central variable display unit 4B) during the operation of the slot machine 1 is described in detail. Meanwhile, as shown in FIG. 11, the display state is described on the basis of a structure in which the display 4 arranges the symbols 180 in a video reel manner.

Figure 11:
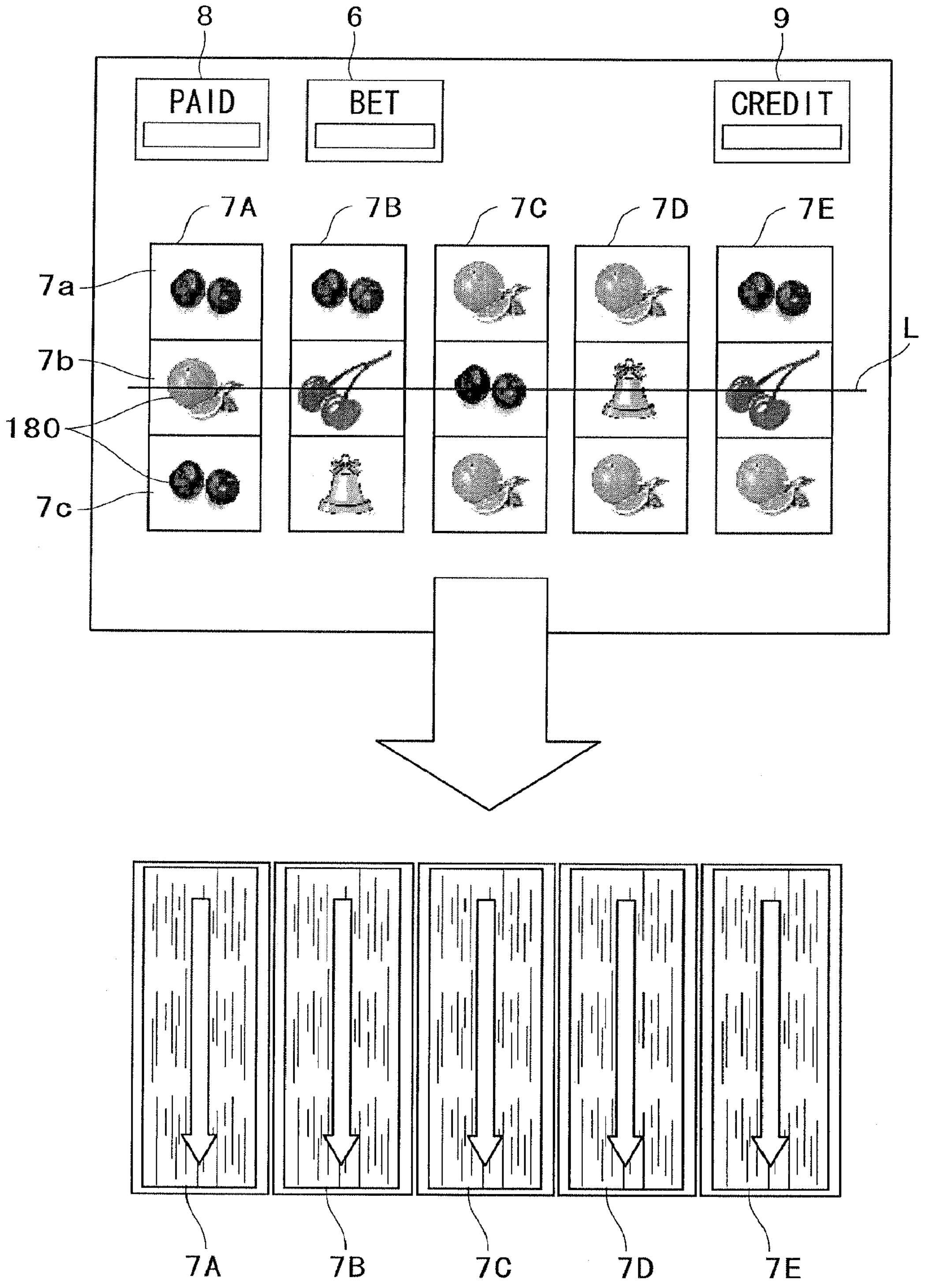
FIG. 11 illustrates a display screen.

FIG. 11 shows a display state of the display 4 when a mini game is stopped. In other words, the bet-number display unit 6, the payout-number display unit 8 or credit-number display unit 9 is displayed in the central liquid crystal panel 5B. In addition, the display windows 7A, 7B, 7C, 7D, 7E are displayed in an enlarged state in the overall screen except the bet-number display unit 6, the payout-number display unit 8 or credit-number display unit 9. When a basic game or free game is started, all the symbols 180 of the display windows 7A, 7B, 7C, 7D, 7E are variably displayed.

In addition, when the mini game is stopped, a football game screen is displayed in the upper variable display unit 4A. The football game screen displays an image in which a player in the football game passes a ball and has an eye on a goal. In the mean time, this image may be a moving picture or still image.

Figure 12:
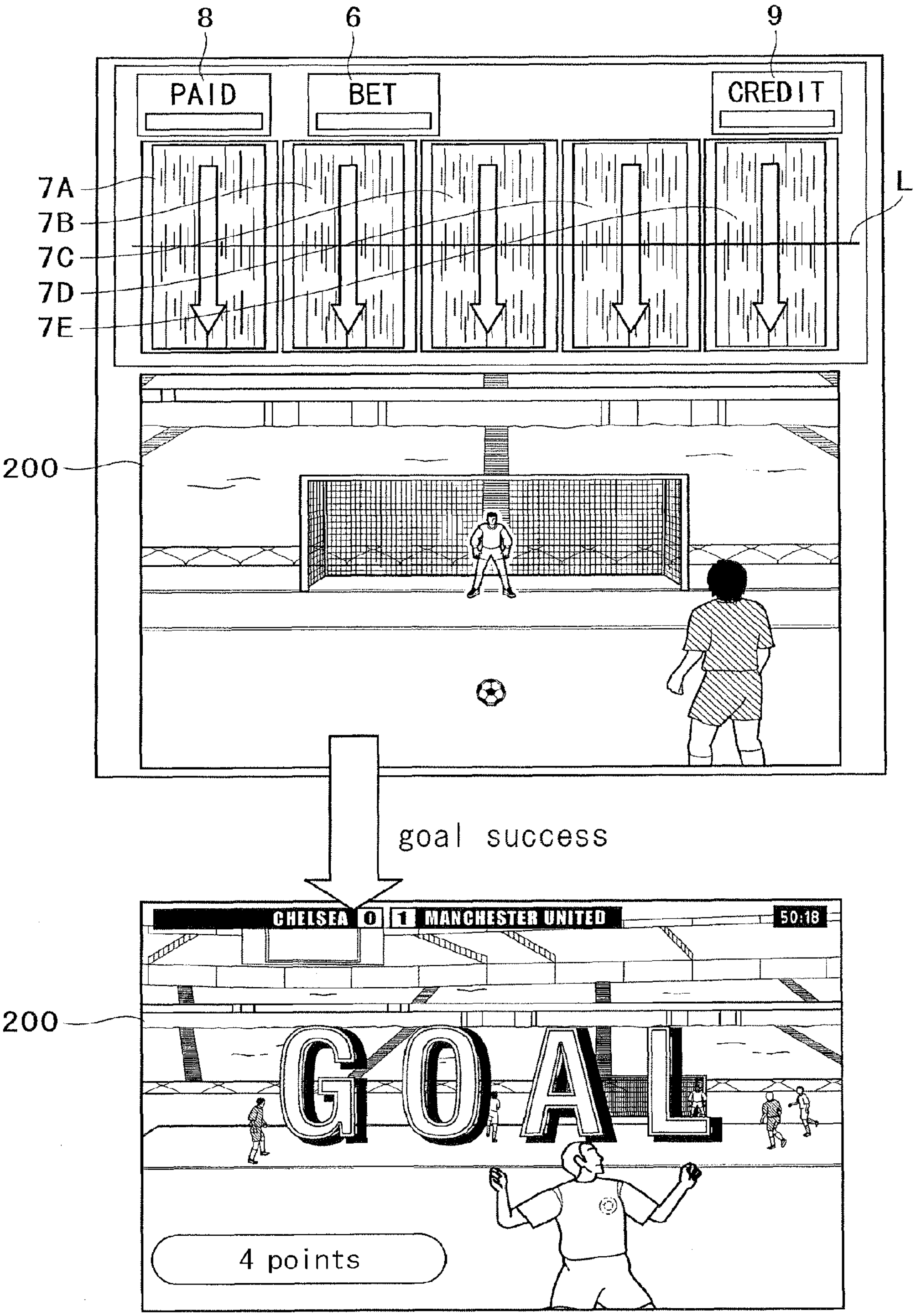
FIG. 12 illustrates a display screen.

FIG. 12 shows a display state of the display 4 when a mini game is executed. In other words, when a mini game is started, the display windows 7A, 7B, 7C, 7D, 7E are downscaled and displayed in the upper-half part of the screen, as shown in FIG. 12. In addition, the mini game screen 200 to execute the mini game is displayed in the lower-half part of the respective display windows 7A, 7B, 7C, 7D, 7E.

The mini game screen 200 shows an image of a penalty-kick shoot-out in a football game. Specifically, a kicker who kicks a ball and a goalkeeper who keeps the ball are displayed as an initial screen. Then, when a predetermined waiting time elapses and then the kicker makes a goal, an image of "GOAL" is displayed and an accumulated point-number is displayed. Thereby, a player can see the points that are acquired by the player. In the mean time, when the kicker does not make a goal, the display is returned to an initial screen of a next penalty-kick shoot-out. In this case, no point occurs.

In addition, during the execution of the mini game, a PK-waiting screen is displayed in the central variable display unit 4B. The PK-waiting screen displays an image showing an overall football stadium. In the mean time, this image may be a moving picture or still image.

(Process Operation)

Figure 13A:
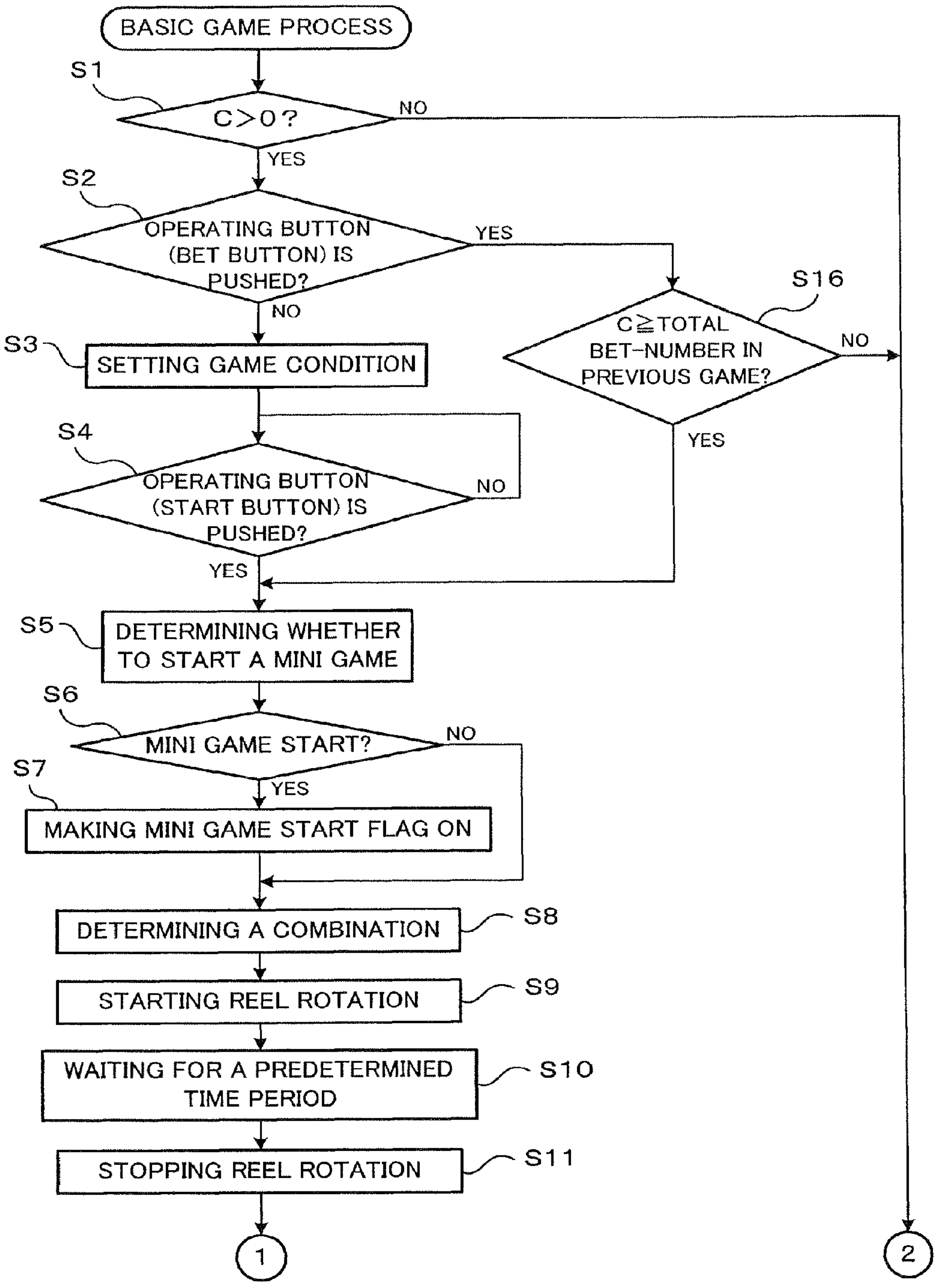
FIG. 13A is a flow chart showing a part of a basic game process.
Figure 13B:
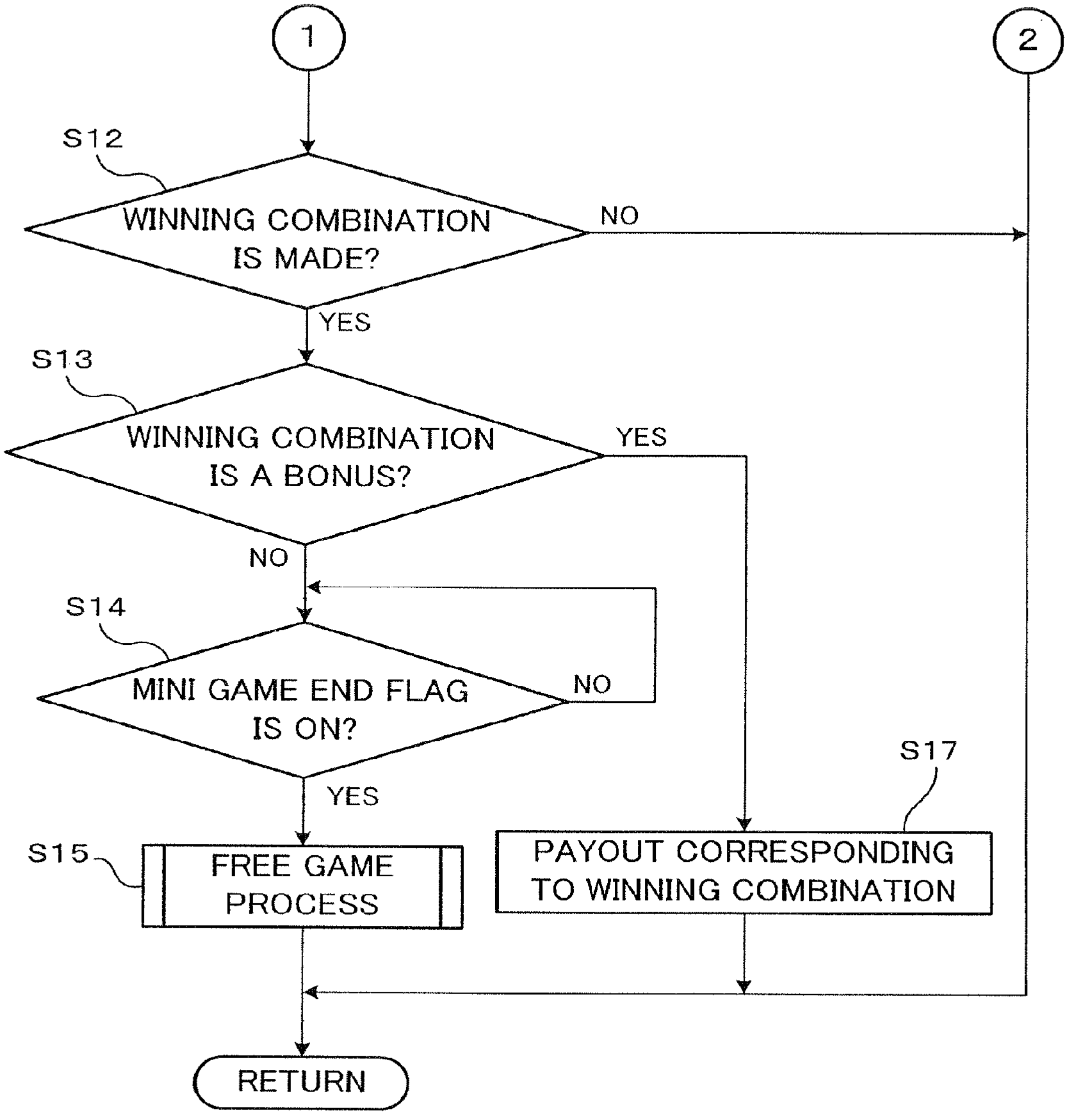
FIG. 13B is a flow chart showing a part of a basic game process.

In the followings, a process that is carried out in the slot machine 1 is described. FIGS. 13A and 13B are flow charts showing process operations in the basic game of the slot machine 1, which are carried out by the main CPU 32 of the slot machine 1. A one-time routine of FIGS. 13A and 13B constitutes a unit game. On the one hand, the slot machine 1 has been started in advance. On the other hand, the parameters used in the main CPU 32 of the game controller are initialized as predetermined values and the slot machine 1 is thus normally operated.

First, it is determined whether the credit is remained which is the remaining number of the coins inserted by the player (S1). Specifically, the credit-number (C) stored in the RAM 33 is read and a process based on the credit-number read is carried out. When the credit-number (C) is "0" (S1, NO), this routine is ended without carrying out any process because a game cannot be started. On the other hand, when the credit-number is "1" or more (S1, YES), the main CPU 32 determines that there remains a credit, and proceeds to a S2.

In the S2, it is determined whether the operating button 11 (bet button) is pushed or not (S2). When the operating button 11 (bet button) is not pushed for a predetermined time period (S2, NO), a game condition is set (S3). Specifically, it is determined the number of coins that will be bet on the pay line L in this game in accordance with the operation of the operating button 11 (bet button). At this time, an operating signal, which is generated in accordance with the operation of the operating button 11 (bet button), is received and a bet-number of the pay line L, which corresponds to the reception number of times of the operation signal, is stored in a predetermined memory area of the RAM 33. Then, the credit-number (C) stored in the predetermined memory area of the RAM 33 is read. A total bet-number having the bet-number added thereto is subtracted from the credit-number (C) read. The resultant value is then stored in the predetermined memory area of the RAM 33.

Then, it is determined whether the operating button 11 (start button) is pushed or not (S4). When the operating button 11 (start button) is not pushed (S4, NO), the process of S4 is repeatedly carried out, so that the waiting state becomes until the operating button 11 is pushed. When the operating button 11 (start button) is pushed (S4, YES), it is determined whether to start a mini game (S5). Specifically, it is determined whether to start a mini game using the table shown in FIG. 9 and the sampled random number value.

In the mean time, in the S2, when the operating button 11 (bet button) is pushed (S2, YES), it is determined whether the credit-number (C) is equal to or larger than the total bet-number in the previous game. Namely, it is determined whether the operating button 11 (bet button) is pushed to start a game. Specifically, when the operating button 11 (bet button) is pushed, it is read the credit-number (C) and the bet-number on the pay line L in the previous game, which are stored in the predetermined memory area of the RAM 33. A process is carried out depending on whether the credit-number (C) is equal to or larger than the total bet-number in the previous game, based on the relation of the credit-number (C) and the bet-number read. When it is determined that the credit-number (C) is less than the total bet-number in the previous game (S16, NO), this routine is ended without carrying out any process because a game cannot be started.

In the mean time, when it is determined that the credit-number (C) is equal to or larger than the total bet-number in the previous game (S16, YES); the total bet-number in the previous game is subtracted from the corresponding credit-number (C). The resultant value is stored in the predetermined memory area of the RAM 33. Then, it is determined whether to start a mini game (S5).

When it is determined to start a mini game (S6, YES), a mini game start flag is set "ON" (S7). Specifically, the data, which indicates that a game start flag is ON, is written in a storage area of the mini game start flag of the RAM 33. Meanwhile, when it is determined not to start a mini game (S6, NO), a combination determining process is carried out (S8).

In the combination determining process, it is determined a combination of symbols to be stopped on the pay line L. Specifically, an instruction is generated which instructs the random number generator 35 to generate a random number. Then, a random number within a predetermined range generated by the random number generator 35 is sampled. The sampled random number is stored in the predetermined memory area of the RAM 33. In the mean time, in this embodiment, the random number is generated in the random number generator 35 that is provided to the outside of the main CPU 32. However, the random number may be generated through a calculation process of the main CPU 32, without the random number generator 35.

Then, it is read a random number table and a winning combination table for awarding a winning, which are stored in the ROM 34. The random number table and the winning combination table read are stored in a predetermined memory area of the RAM 33. In the mean time, a stop display for each reel is controlled, based on the random number table.

Then, the random number table and the winning combination table stored in the predetermined memory area of the RAM 33 are read out. The random number written in the predetermined memory area of the RAM 33 is used as parameter to refer to the corresponding random number table. Then, a combination of symbols to be stopped on the pay line L is determined.

When a winning combination is determined, the winning combination table is stored in the predetermined memory area of the RAM 33. The random number value and the winning combination table, which are stored in the predetermined memory area of the RAM 33, are read out. Then, a stop symbol combination to be stop-displayed is determined, based on the random number value and the winning combination table read. At this time, the symbol arrangement table stored in the ROM 34 is read out, stored in the predetermined memory area of the RAM and referred to by the main CPU 32. The data of the determined stop symbol is stored in the predetermined memory area of the RAM 33. In the mean time, alternatively, the stop symbol may be determined for each reel with the random number table.

When a combination of symbols to be stopped on the pay line L is determined, it is determined whether the combination of symbols to be stopped on the pay line L is a winning combination or not. When the combination of symbols to be stopped on the pay line L is a winning combination, a flag is activated which indicates that a payout indicating a type of the winning combination will be awarded, so as to generate a winning on the pay line L, which corresponds to a symbol combination that is the determined winning combination. The flag indicating that the activated winning will be awarded is stored in the predetermined memory area of the RAM 33. In the mean time, when the combination of symbols to be stopped on the pay line L is the other winning combination, i.e., when the combination is a combination of "losing", the flag indicating that the winning will be awarded is not activated.

After the above combination determining process is executed, it is displayed an image of rotating the symbols 180 in the display windows 7A~7E. Specifically, it is displayed an image of rotating each of the display windows 7A~7E sequentially or simultaneously, based on the symbol arrangement table (not shown) stored in the RAM 33.

When the image of starting the rotation of the display windows 7A~7E is displayed, the waiting state becomes until a predetermined time period elapses (S10). Then, the rotation of the display windows 7A~7E is automatically stopped (S11).

Specifically, it is carried out a display of sequentially or simultaneously stopping the rotation image of the display windows 7A~7E so that the stop symbols, which correspond to the winning combination determined in the S8 on the basis of the winning combination written in the predetermined memory area of the RAM 33, are displayed in a display area having a visually interactive relation with a player.

Then, it is determined whether a winning combination is made through the combination determining process of the S8 (S12). Specifically, the determination is carried out, based on a state of the flag indicating that a winning relating to the pay line L, which is stored in the predetermined memory area of the RAM 33, will be awarded. When the flag indicating that a winning will be awarded is not activated (S12, NO), it is determined that a winning combination is not made, and this routine is thus ended.

Meanwhile, when the flag indicating that a winning will be awarded is activated (S12, YES), it is determined whether the winning combination, which is made through the combination determining process of the S8, is "BLUE 7." Specifically, when the winning combination is "BLUE 7" (S13, YES), the coins corresponding to the winning combination is paid out (S17) and this routine is then ended.

In the mean time, when the winning combination is not "BLUE 7" (S13, NO), it is determined whether a mini game end flag is ON or not (S14). Specifically, it is determined whether data, which indicates that a mini game end flag is ON, is stored in a mini game end flag area of the RAM 33. When it is determined that the mini game end flag is not ON (S14, NO), the process of S14 is repeatedly carried out, so that the waiting state becomes. When it is determined that the mini game end flag is ON (S14, YES), a free game process is executed (S15). Then, this routine is ended.

(Free Game Process)

Figure 14:
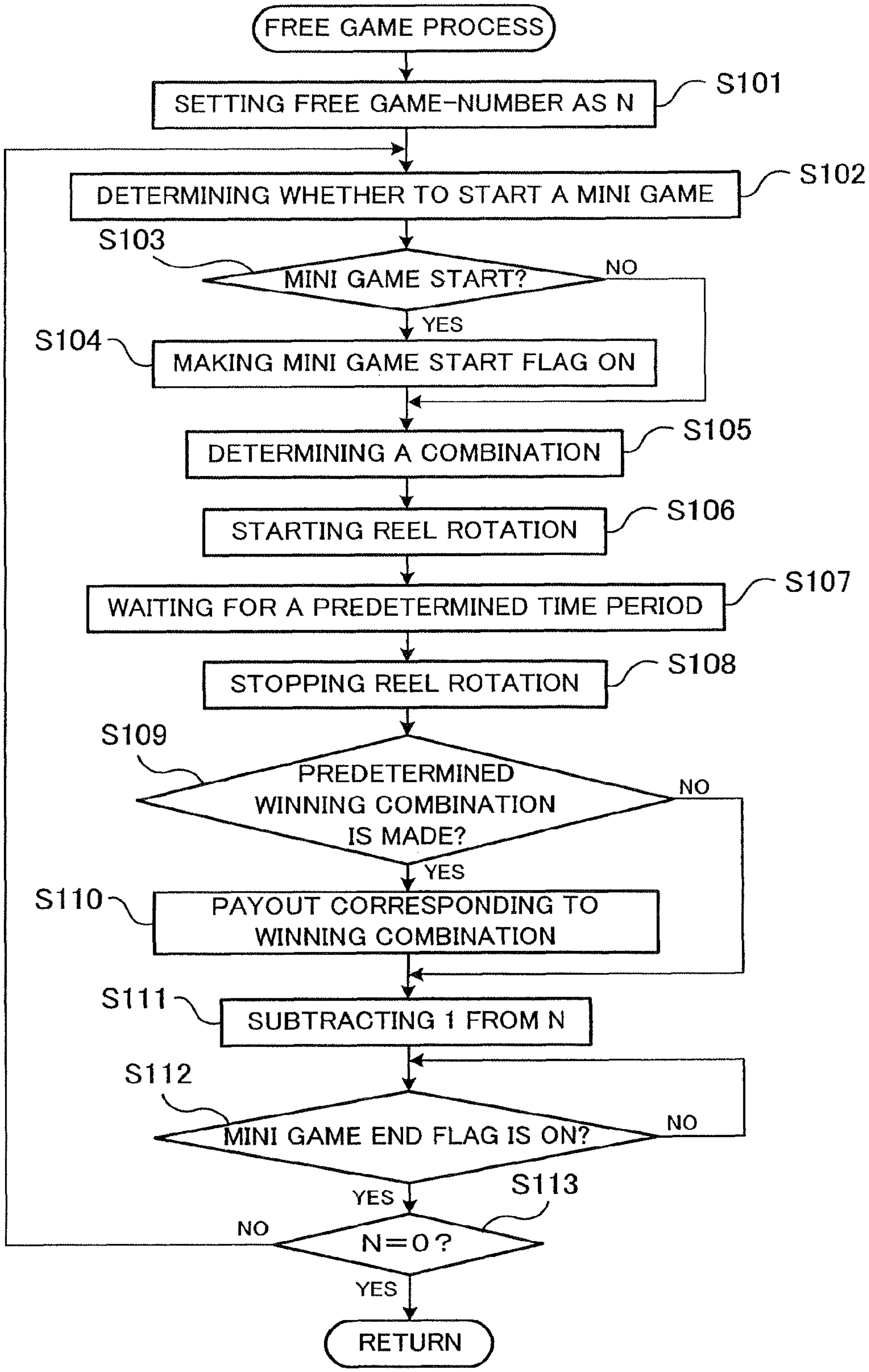
FIG. 14 is a flow chart of a mini game process.

In the followings, a free game process is described with reference to FIG. 14.

First, a free game-number is set to be N. The free game-number is determined depending on the accumulated number of points that are acquired in the mini game of the basic game.

Then, it is determined whether to start a mini game. Specifically, it is determined whether to start a mini game, through the table shown in FIG. 9 and the sampled random number value. When it is determined to start the mini game (S103, YES), the mini game start flag is set "ON" (S104). Specifically, the data indicating that the mini game start flag is ON is written in the storage area of the mini game start flag of the RAM 33. Then, the main CPU 32 proceeds to a process of S105.

On the other hand, when it is determined not to start the mini game (S103, NO), the main CPU 32 directly proceeds to the process of S105. Thereby, it is carried out the combination determining process as described above. A difference of this combination determining process is that a random number table to be referred to is a random number table for a free game (not shown). Then, it is displayed an image of starting to rotate the display windows 7A~7E (S106). After waiting for a predetermined time period (S107), it is displayed an image of stopping the rotation of the display windows 7A~7E (S108).

Then, it is determined whether a winning combination is made or not (S109). When a winning combination is not made (S109, NO), the main CPU 32 proceeds to a process of S111. When a winning combination is made (S109, YES), the payout process relating to the winning combination is carried out (S110). Specifically, the payout management table of FIG. 7 is referred to calculate a payout-number of coins, which corresponds to the winning combination. Then, the credit-number stored in the predetermined memory area of the RAM 33 is read out. The calculated value is added to the credit-number read. The resultant value is stored in the predetermined memory area of the RAM 33 and the corresponding stored value is displayed in the credit-number display unit 9.

In the process of Sill, 1 is subtracted from N (S111). Then, it is determined whether the mini game end flag is ON or not (S112). Specifically, it is determined whether the data, which indicates that the mini game end flag is ON, is stored in the mini game end flag area of the RAM 33. When it is determined that the mini game end flag is not ON (S112, NO), the process of S112 is repeatedly carried out, so that the waiting state becomes.

When it is determined that the mini game end flag is ON (S112, YES), it is continued to determine whether N is 0 or not (S113). When it is determined that N is not 0 (S113, NO), the process is re-executed from the S102. In the mean time, when it is determined that N is 0 (S113, YES), this routine is ended.

(Mini Game Process)

Figure 15:
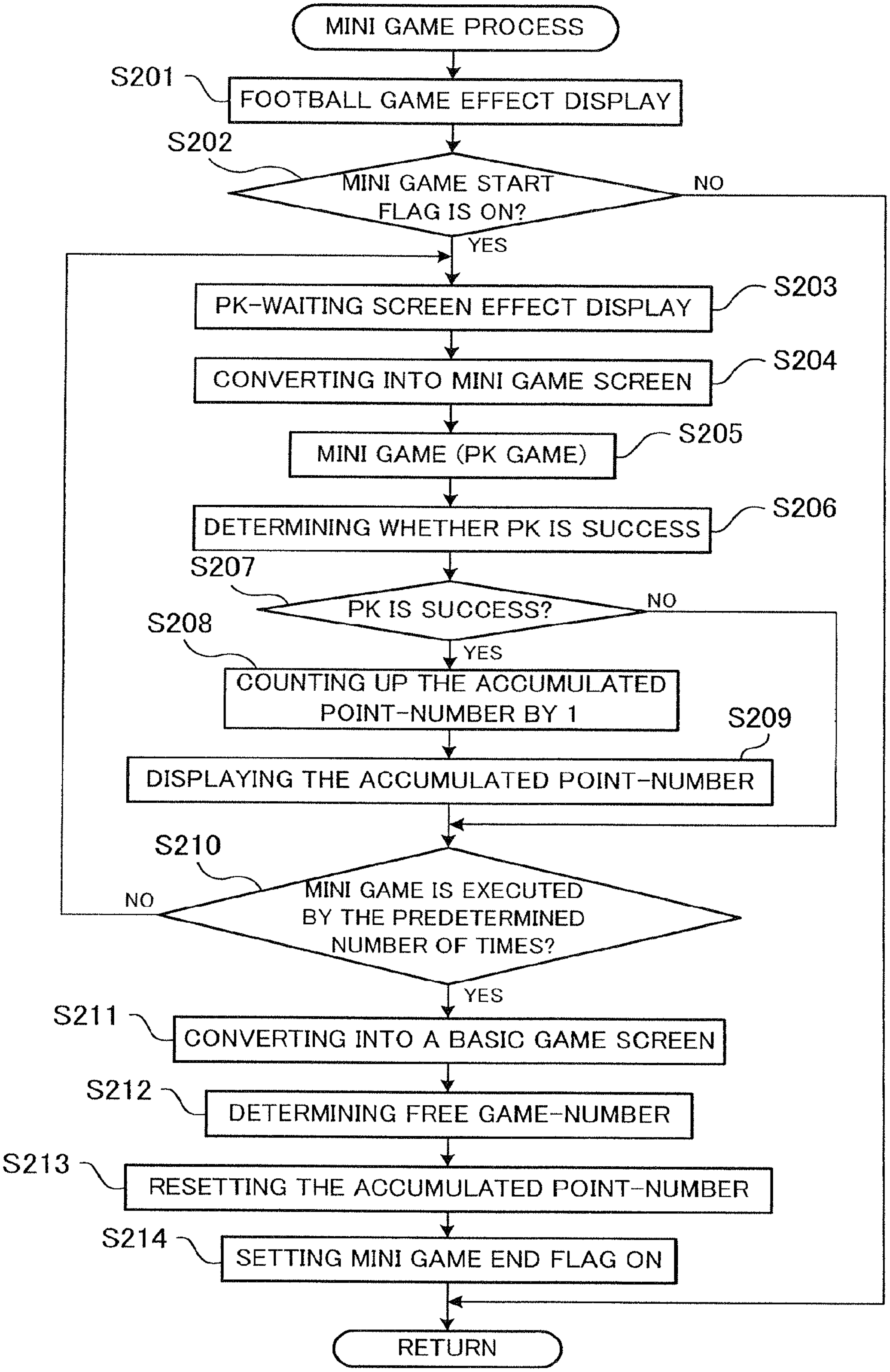
FIG. 15 is a flow chart of a free game process.

In the followings, a mini game process is described with reference to FIG. 15.

First, a football game display that is an effect screen during the stop of the mini game is displayed in the upper liquid crystal panel 5A (S201). Then, it is determined whether the mini game start flag is ON or not. Specifically, it is determined whether the data, which indicates that the mini game start flag is ON, is stored in the game start flag area of the RAM 33 (S202).

When it is determined that the mini game start flag is not ON (S202, NO), this routine is ended. In the mean time, when it is determined that the mini game start flag is ON (S202, YES), in the upper liquid crystal panel 5A, the football game screen may be converted into a PK-waiting screen that is an effect screen during execution of the mini game, as shown in FIG. 1. Then, the mini game screen 200 is displayed in the central liquid crystal panel 5B, so that the display windows 7A, 7B, 7C, 7D, 7E and the mini game screen 200 are displayed in the upper and lower areas (S204).

Then, a penalty-kick shoot-out that is a mini game is started (S205). In other words, an image in which a goalkeeper and a kicker stand opposite to each other is displayed and sounds of spectators are outputted. Then, when the kicker puts on a ball and intends to kick it, it is determined whether a penalty-kick ends in success, i.e., whether the mini game ends in success (S206). Specifically, it is determined whether the mini game is made to end in success, through the table shown in FIG. 10 and the sampled random number value.

Then, it is determined whether the penalty-kick (mini game) ends in success (S207). When the penalty-kick ends in success (S207, YES), the accumulated point-number is counted up by 1 (S208) and the accumulated point-number is displayed (S209). Then, it is determined whether the mini game is executed by the predetermined number of times (S210). Meanwhile, when the penalty-kick ends in failure (S207, NO), the accumulated point-number is not counted up and it is determined whether the mini game is executed by the predetermined number of times (S210).

When it is determined that the mini game is not executed by the predetermined number of times (S210, NO), the process is re-executed from the S203 and a next penalty-kick shoot-out is started. For example, when the penalty-kick shoot-out is repeatedly carried out by ten times (S210, YES), the screen is converted into a basic game screen (S211). Then, a free game-number is determined (S212) and the accumulated point-number is reset (S213). Then, the mini game end flag is set ON (S214) and this routine is then ended.

Although the above descriptions have been provided with regard to the characteristic parts so as to understand the invention more easily, the invention is not limited to the embodiment as described above and can be applied to the other embodiments and the applicable scope should be construed as broadly as possible. Furthermore, the terms and phraseology used in the specification have been used to correctly illustrate the invention, not to limit it. In addition, it will be understood by those skilled in the art that the other structures, systems, methods and the like included in the spirit of the invention can be derived from the spirit of the invention described in the specification. Accordingly, it should be considered that the invention covers equivalent structures thereof without departing from the spirit and scope of the invention as defined in the following claims. Further, the abstract is provided so that an intellectual property office and a general public institution or one skilled in the art who is not familiar with patent and legal or professional terminology can quickly analyze the technical features and essences of the invention through a simple investigation. Accordingly, the abstract is not intended to limit the scope of the invention that should be evaluated by the claims. In addition, it is required to sufficiently refer to the documents that have been already disclosed, so as to fully understand the objects and effects of the invention.

The above descriptions include a process that is executed on a computer or computer network. The above descriptions and expressions have been provided so that the one skilled in the art can understand the invention most effectively. In the specification, the respective steps used to induce one result or blocks having a predetermined processing function should be understood as a process having no self-contradiction. In addition, the electrical or magnetic signal is transmitted/received and written in the respective steps or blocks. Although the processes in the respective steps or blocks embody the signal as a bit, value, symbol, character, term, number and the like, it should be noted that these have been used for the convenience of descriptions. Further, although the processes in the respective steps or blocks have been often described as an expression common to a human action, the process described in the specification is executed by a variety of devices in principle. In addition, the other structures necessary for the respective steps or blocks are apparent from the above descriptions.

What is claimed is:

1. A gaming machine comprising: a display that displays an image, a memory that stores an accumulated point-number to be updated depending on an execution result of a mini game, an input device that outputs a signal to start a basic game, and a game controller, wherein the game controller is programmed:

(a1) to start the basic game as the signal is received from the input device;

(a2) to determine whether to execute the mini game at least during execution of the basic game based on a sampled random number value and a mini game start determining table;

(a3) to display the predetermined number of penalty-kick shoot-out images in the display, when it is determined to execute the mini game;

(a4) to add a point-number corresponding to the number of victory times to the accumulated point-number to update the accumulated point-number, when the penalty-kick shoot-out ends in victory;

(a5) to determine a game-number of a free game depending on the accumulated point-number after executing the mini game;

(a6) to determine whether a winning combination occurs based on a random number value and a winning combination table in the basic game;

(a7) to determine whether the winning combination is a bonus or not, when the winning combination occurs;

(a8) to payout an award corresponding to the winning combination, when the winning combination is the bonus;

(a9) to determine whether the mini game is ended or not, when the winning combination is not the bonus;

and (a10) to execute the free game by the accumulated point-number, when the mini game is ended.

2. The gaming machine of claim 1, wherein the game controller is programmed to display a football game image in the display at least during execution of the basic game.

3. The gaming machine of claim 1, wherein the game controller is programmed to display a setting image enabling a player to determine at least one of a ball speed and a ball direction in the penalty-kick shoot-out.

4. A gaming machine comprising: a display that displays an image, a memory that stores an accumulated point-number to be updated depending on an execution result of a mini game, an input device that outputs a signal to start a basic game, and a game controller, wherein the game controller is programmed:

(a1) to start the basic game as the signal is received from the input device;

(a2) to determine whether to execute the mini game at least during execution of the basic game based on a sampled random number value and a mini game start determining table;

(a3) to display the predetermined number of the mini game images in the display, when it is determined to execute the mini game;

(a4) to add a point-number corresponding to the number of victory times to the accumulated point-number to update the accumulated point-number, when the mini game ends in victory;

(a5) to determine a game-number of a free game depending on the accumulated point-number after executing the mini game;

(a6) to determine whether a winning combination occurs based on a random number value and a winning combination table in the basic game;

(a7) to determine whether the winning combination is a bonus or not, when the winning combination occurs;

(a8) to payout an award corresponding to the winning combination, when the winning combination is the bonus;

(a9) to determine whether the mini game is ended or not, when the winning combination is not the bonus;

and (a10) to execute the free game by the accumulated point-number, when the mini game is ended.

* * * * *